(12) United States Patent
Stark et al.

(10) Patent No.: US 11,969,659 B2
(45) Date of Patent: Apr. 30, 2024

(54) MOUNT FOR HOLDING A HANDHELD DEVICE

(71) Applicants: Justin Paul Stark, Stafford, TX (US); Joshua Jacques Slocumb, Fort Lauderdale, FL (US)

(72) Inventors: Justin Paul Stark, Stafford, TX (US); Joshua Jacques Slocumb, Fort Lauderdale, FL (US)

( * ) Notice: Subject to any disclaimer, the term of this patent is extended or adjusted under 35 U.S.C. 154(b) by 45 days.

(21) Appl. No.: 17/647,831

(22) Filed: Jan. 12, 2022

(65) Prior Publication Data

US 2022/0134241 A1    May 5, 2022

(51) Int. Cl.
*F16M 13/00* (2006.01)
*A63F 13/98* (2014.01)
*F16M 11/04* (2006.01)

(52) U.S. Cl.
CPC ........... *A63F 13/98* (2014.09); *F16M 11/041* (2013.01)

(58) Field of Classification Search
CPC .............................. A63F 13/98; F16M 11/041
See application file for complete search history.

(56) References Cited

U.S. PATENT DOCUMENTS

| | | | | |
|---|---|---|---|---|
| 1,438,659 A * | 12/1922 | Nailor | ................ | A22C 21/0007 248/303 |
| 2,025,707 A * | 12/1935 | Consolazio | ............ | A47G 7/044 211/88.03 |
| 2,221,659 A * | 11/1940 | Wilkie | .................... | A47F 7/148 D6/678.4 |
| 2,949,510 A * | 8/1960 | Sichel | ..................... | H04M 1/05 379/450 |
| 3,802,657 A * | 4/1974 | Jackson | .................. | H04M 1/04 5/503.1 |
| 4,566,666 A * | 1/1986 | Meska | ..................... | A47K 1/08 248/302 |
| 4,672,703 A * | 6/1987 | Frazier | ................. | A61G 7/0507 248/302 |
| 5,074,506 A * | 12/1991 | Larsen | .................... | B63B 17/00 D34/6 |
| 6,102,218 A * | 8/2000 | Alfonso | ............... | A47B 96/061 248/303 |
| 6,257,421 B1 * | 7/2001 | Outten | .................... | A47F 7/148 248/303 |
| 7,942,747 B2 | 5/2011 | Cole | | |
| 2002/0125391 A1 | 9/2002 | Jackson | | |
| 2006/0289367 A1 * | 12/2006 | Cossey | ................. | A45D 44/06 211/13.1 |
| 2008/0230987 A1 | 9/2008 | Jackson | | |
| 2009/0325717 A1 | 12/2009 | Lee-Him | | |

* cited by examiner

*Primary Examiner* — Amy J. Sterling

(57) ABSTRACT

A mount, that includes a first ring adapted to allow a first grip of a handheld device to pass partially therethrough, that includes a first ring outer portion adapted to prevent lateral movement of the first grip, and a second ring adapted to allow a second grip of the handheld device to pass partially therethrough, that includes a second ring outer portion adapted to prevent lateral movement of the second grip.

27 Claims, 42 Drawing Sheets

MOUNT FOR HOLDING A HANDHELD DEVICE

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

SUMMARY

In general, in one aspect, embodiments relate to a mount, that includes a first ring adapted to allow a first grip of a handheld device to pass partially therethrough, that includes a first ring outer portion adapted to prevent lateral movement of the first grip, and a second ring adapted to allow a second grip of the handheld device to pass partially therethrough, that includes a second ring outer portion adapted to prevent lateral movement of the second grip.

In general, in one aspect, embodiments relate to a mount, that includes a seat adapted to support an underside of a handheld device without grips, a first ring, that includes a first ring outer portion adapted to prevent lateral movement of the handheld device, and a second ring, that includes a second ring outer portion adapted to prevent lateral movement of the handheld device.

Other aspects of the invention will be apparent from the following description and the appended claims.

DETAILED DESCRIPTION

Figure 1A:
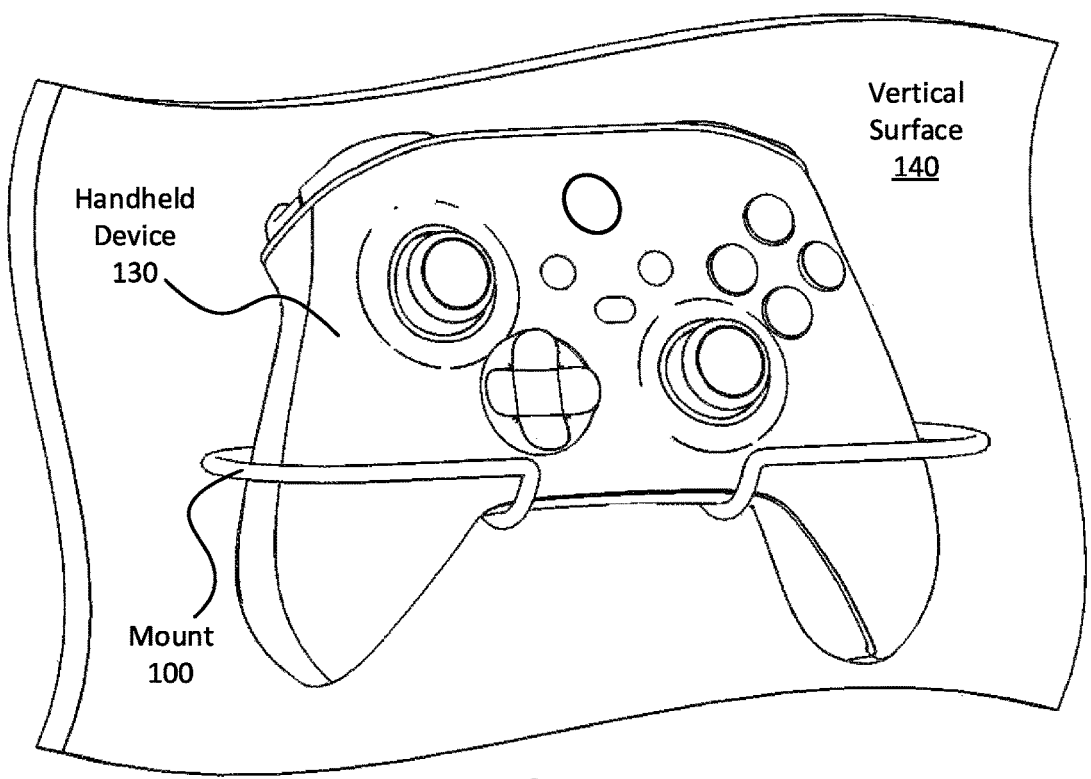
FIG. 1A shows a diagram of a mount and a handheld device, in accordance with one or more embodiments of the invention.

A poorly-designed mount may hold a handheld device in such a way that accidental contact with the handheld device (or mount) may cause the handheld device to fall from the mount—thereby causing damage to the handheld device (e.g., upon impact with another structure). Further, a poorly-designed mount may support a handheld device in an unstable equilibrium that, over time, may allow for the handheld device to slip from the mount and fall (e.g., as vibrations felt by the mount cause movement of the handheld device away from the unstable equilibrium). In either case, removing the handheld device from a poorly-designed mount may only require lateral forces on the handheld device before gravity detaches the handheld device completely. Accordingly, although such poorly-designed mounts may function to hold the handheld device, they may pose a constant risk of damage to the handheld device.

Ideally, when mounting a handheld device, a better-designed mount holds the handheld device with sufficient structural support and constraints such that the handheld device could not become detached from the mount without intentional human interaction. Yet, the intentional human interaction required to remove the handheld device from the mount should not be cumbersome. Instead, an intuitive, simple, and intentional human motion should allow for removing the handheld device with appropriate effort.

As disclosed herein, a mount may include one or more "rings" that sufficiently constrain one or more "grips" of the handheld device such that the handheld device cannot separate from the mount without first being moved upward (i.e., against gravity). That is, unlike a poorly-designed mount, the rings (of a better-designed mount) constrain lateral movement of the handheld device. Accordingly, merely placing lateral forces on the handheld device will not cause the handheld device to detach from the mount (i.e., the handheld device is held in a stable equilibrium).

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element—unless expressly disclosed, such as by the use of the terms "before", "after", "single", and other such terminology. Rather, the use of ordinal numbers is to distinguish between elements. By way of an example, a first element is distinct from a second element, and the first element may encompass more than one element and succeed (or precede) the second element in an ordering of elements.

FIGS. 1A-1B

Figure 1B:
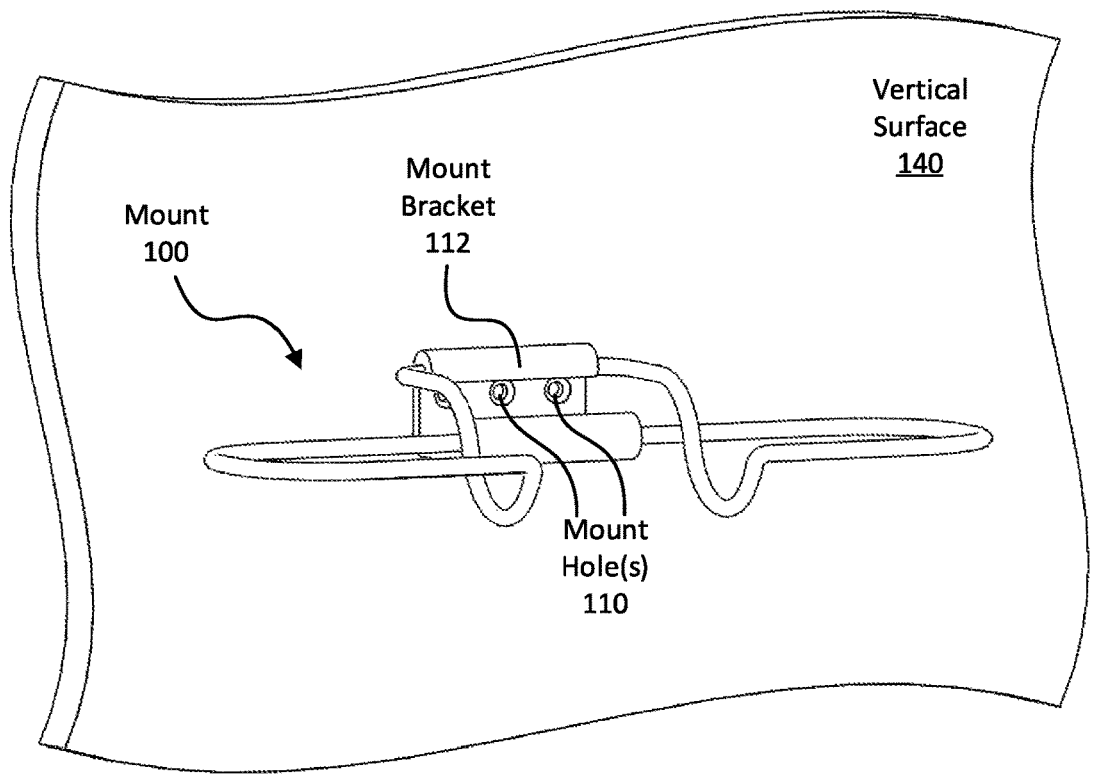
FIG. 1B shows a diagram of a mount, in accordance with one or more embodiments of the invention.

FIGS. 1A and 1B show a diagram of a mount (and a handheld device in FIG. 1A), in accordance with one or more embodiments of the invention. A mount (e.g., mount (100)) may be affixed to a vertical surface (e.g., vertical surface (140)) via a mount bracket (e.g., mount bracket (112)). Further, the mount (100) may be supporting a handheld device (e.g., handheld device (130)). Each of these components is described below.

In one or more embodiments of the invention, a vertical surface (e.g., vertical surface (140)) is a surface that is substantially orthogonal (e.g., perpendicular) to a horizontal surface. Non-limiting examples of a vertical surface (140) include a wall and the sides of furniture (e.g., a desk, cabinet, etc.).

In one or more embodiments of the invention, a mount (e.g., mount (100)) is a structure adapted to support (e.g., physically hold) a handheld device (130). Additional details regarding the mount (100) may be found in the description of FIGS. 2A-2F.

In one or more embodiments of the invention, a handheld device (e.g., handheld device (130)) is a device that a human (not shown) may hold in one or more hand(s). A handheld device (130) may be electronic (e.g., a gaming controller) and used with another electronic device (e.g., a gaming console, computer, etc.). Additional details regarding the handheld device (130) may be found in the description of FIGS. 3A-5B.

In one or more embodiments of the invention, a mount bracket (e.g., mount bracket (112)) is a structural element, connected to and/or part of the mount (100), that is adapted to allow the mount (100) to connect (e.g., affix, maintain contact) to a vertical surface (140). A mount bracket (112) may include one or more mount hole(s) (110) to aide in connecting the mount bracket (112) to a vertical surface (140). In one or more embodiments of the invention, a mount bracket (112) may include one or more magnet(s) (not shown) to connect the mount bracket (112) to a vertical surface (140).

In one or more embodiments of the invention, a mount hole (e.g., mount hole (110)) is a through hole that allows a fastener (e.g., screws, machine screws, bolts, nails, pins, cable ties, etc.) to pass, at least, partially therethrough. Fasteners (not shown) may maintain contact with the mount bracket (112) and the vertical surface (140) thereby limiting movement of the mount bracket (112) (and mount (100) as a whole) with respect to the vertical surface (140). One of ordinary skill in the art, given the benefit of this detailed description, would appreciate using a fastener to mount a structure to a surface.

While FIGS. 1A-1B show a specific configuration of a mount, other configurations may be used without departing from the scope of the invention. Accordingly, embodiments disclosed herein should not be limited to the configuration of devices and/or components shown in FIGS. 1A-1B.

FIGS. 1C-1D

Figure 1C:
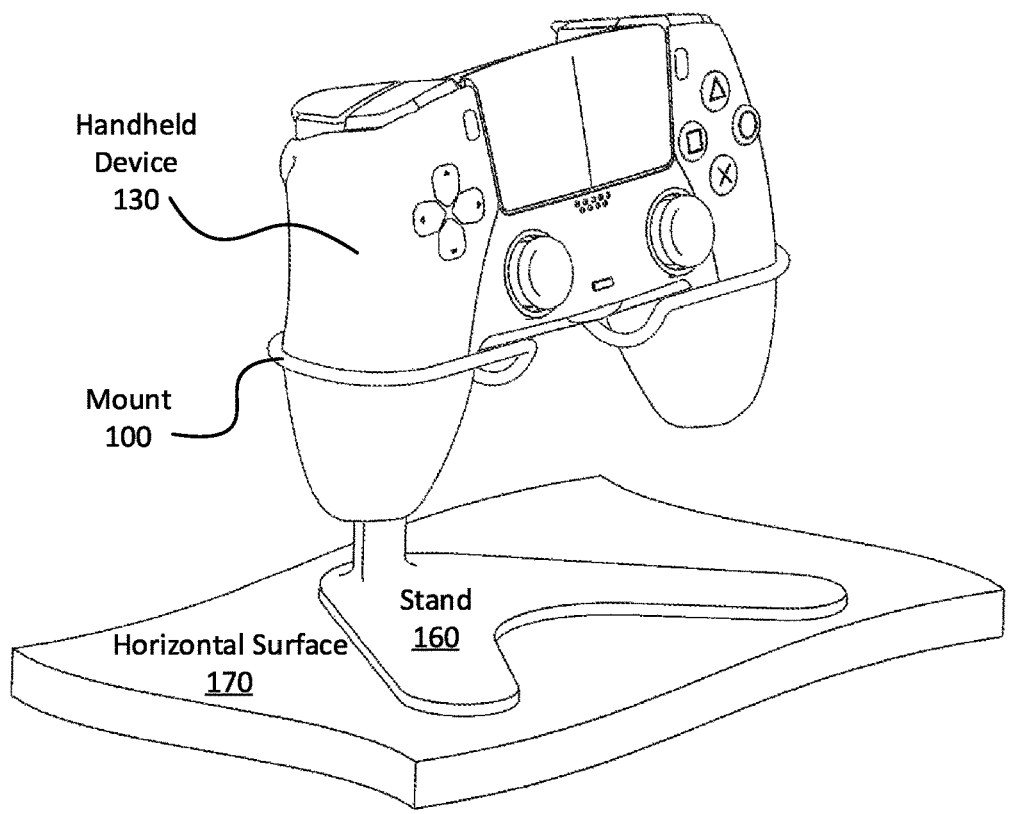
FIG. 1C shows a diagram of a mount and a handheld device, in accordance with one or more embodiments of the invention.
Figure 1D:
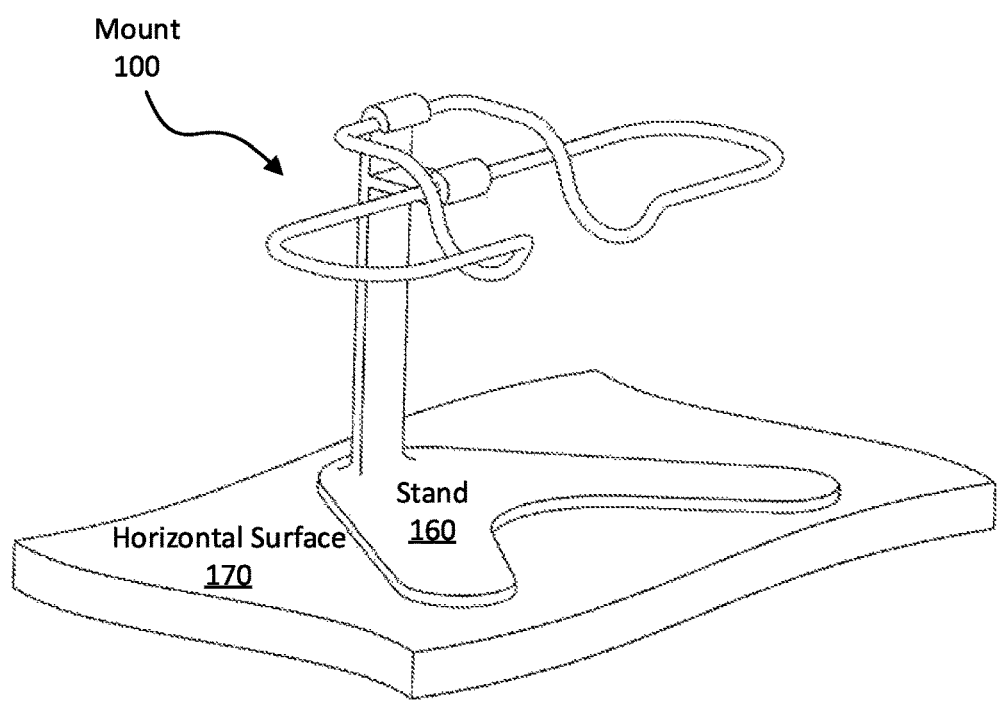
FIG. 1D shows a diagram of a mount, in accordance with one or more embodiments of the invention.
Figure 2A:
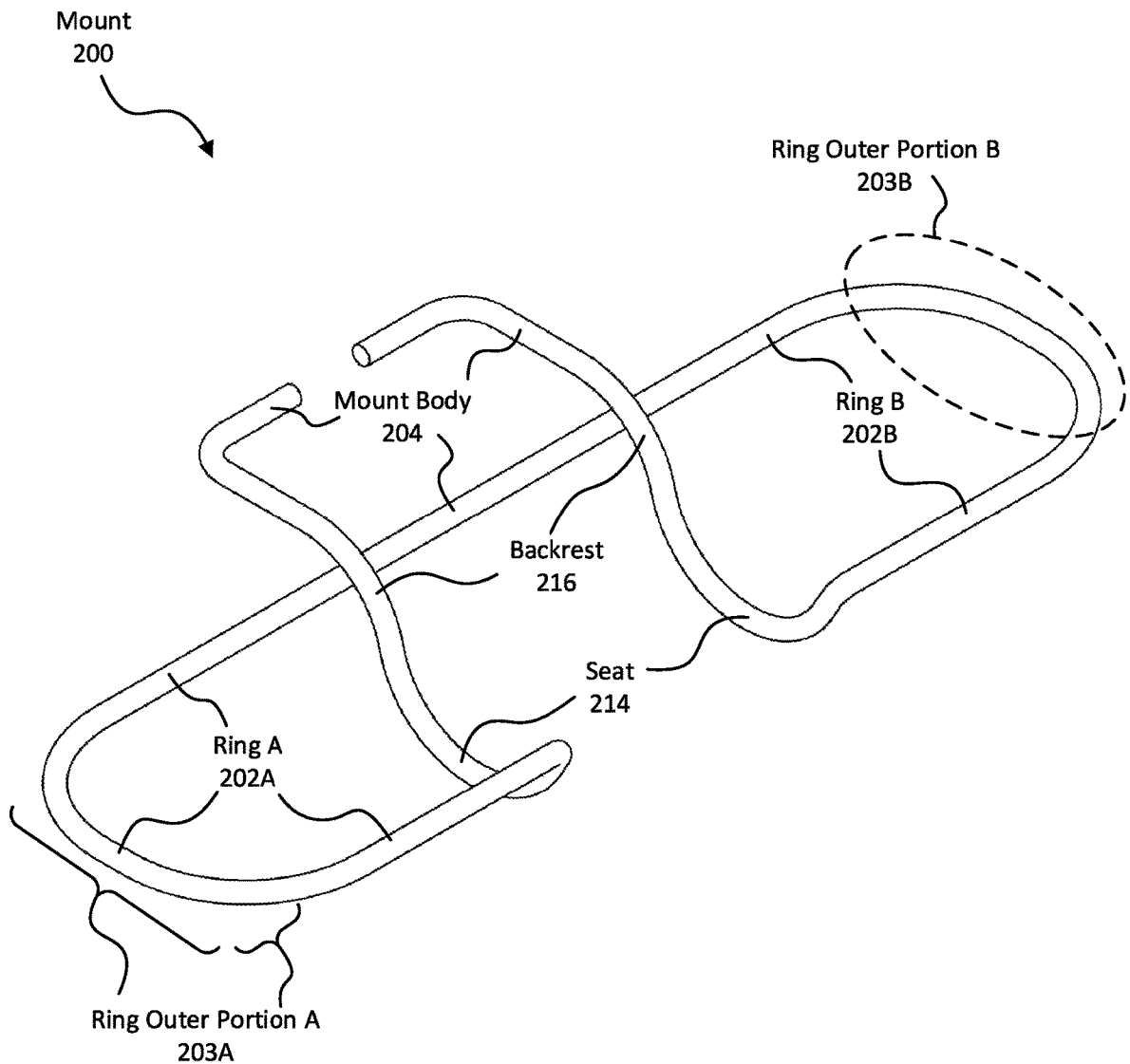
FIG. 2A shows an isometric view of an example of a mount, in accordance with one or more embodiments of the invention.
Figure 2B:
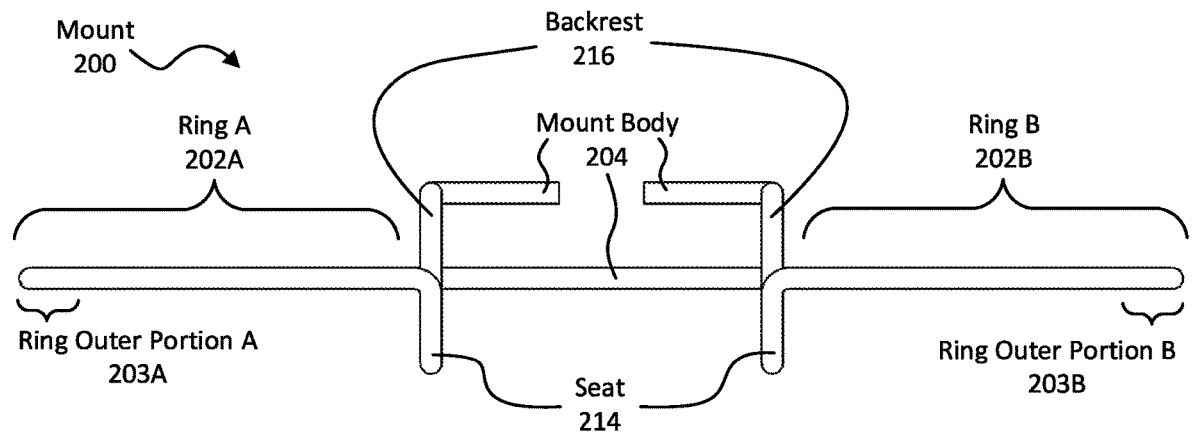
FIG. 2B shows a front view of the example mount shown in FIG. 2A, in accordance with one or more embodiments of the invention.
Figure 2C:
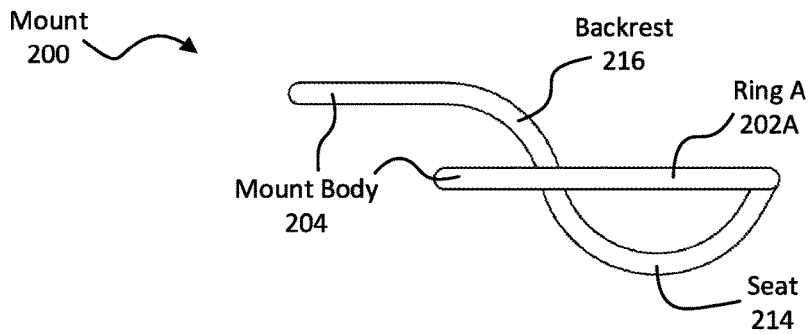
FIG. 2C shows a left view of the example mount shown in FIG. 2A, in accordance with one or more embodiments of the invention.
Figure 2D:
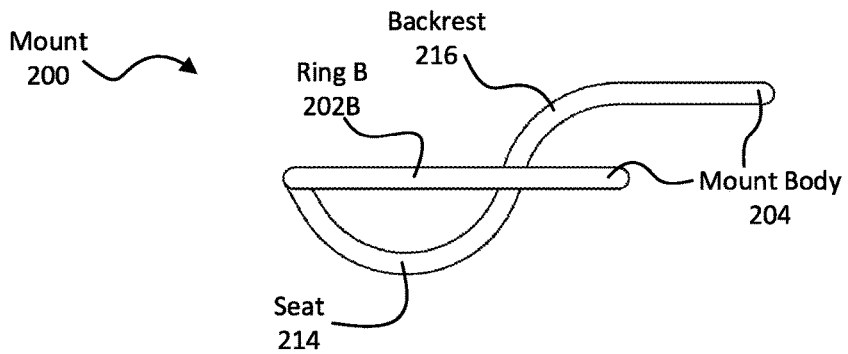
FIG. 2D shows a right view of the example mount shown in FIG. 2A, in accordance with one or more embodiments of the invention.
Figure 2E:
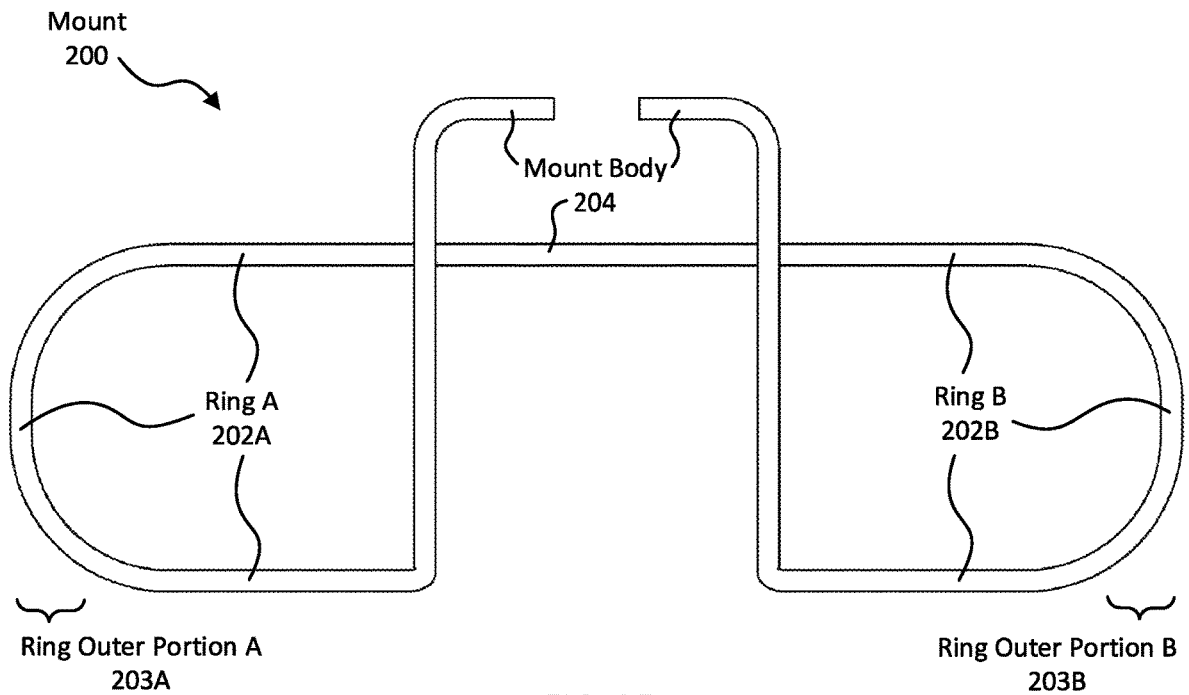
FIG. 2E shows a top view of the example mount shown in FIG. 2A, in accordance with one or more embodiments of the invention.
Figure 2F:
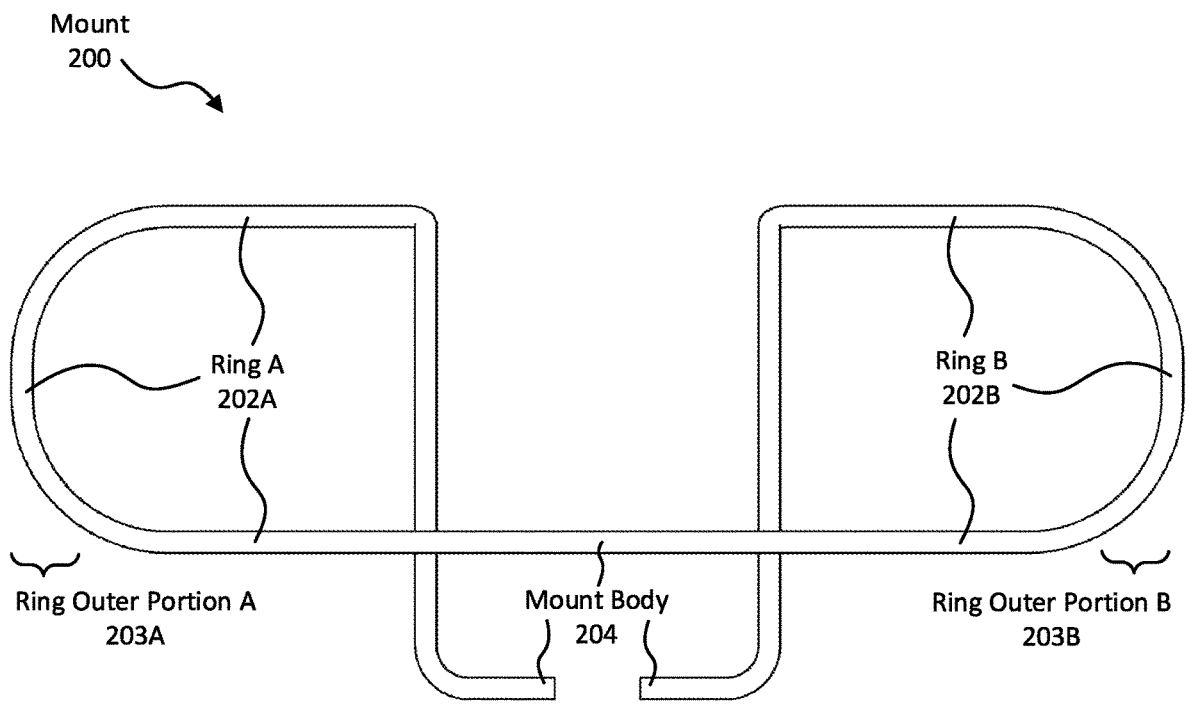
FIG. 2F shows a bottom view of the example mount shown in FIG. 2A, in accordance with one or more embodiments of the invention.

FIGS. 1C and 1D show a diagram of a mount (and a handheld device in FIG. 1C), in accordance with one or more embodiments of the invention. A mount (e.g., mount (100)) may be sitting on a horizontal surface (e.g., horizontal surface (170)) via a stand (e.g., stand (160)). Further, the mount (100) may be supporting a handheld device (e.g., handheld device (130)). Similarly named components, shown in this figure, have all of the same properties and functionalities as described in previous figures. Accordingly, only additional components, properties, and functionalities will be described below.

In one or more embodiments of the invention, a horizontal surface (e.g., horizontal surface (170)) is a surface that is substantially parallel to a horizontal plane. Non-limiting examples of a horizontal surface (170) include the flooring inside a building, a top surface of desk/shelf, and/or a (locally) flat and level surface of the Earth.

In one or more embodiments of the invention, a stand (e.g., stand (160)) is a structural element, connected to and/or part of the mount (100), that is adapted to allow the mount (100) to sit on a horizontal surface (170) without changing orientation (e.g., falling over). A stand (160) may be constructed to form a sufficiently large enough footprint such that the center-of-mass of the mount (100) (with or without a handheld device (130)) is located within the outer-most contours of the stand (160) (when projected onto the horizontal surface (170)).

While FIGS. 1C-1D show a specific configuration of a mount, other configurations may be used without departing from the scope of the invention. Accordingly, embodiments disclosed herein should not be limited to the configuration of devices and/or components shown in FIGS. 1C-1D.

FIGS. 2A-2F

FIGS. 2A-2F show an example of a mount, in accordance with one or more embodiments of the invention. A mount (e.g., mount (200)) may include a mount body (e.g., mount body (204)), one or more ring(s) (e.g., ring A (202A), ring B (202B)). In one or more embodiments of the invention, a mount is adapted to accept (e.g., support, physically hold) a handheld device (not shown). Each of these components is described below.

In one or more embodiments of the invention, a mount body (e.g., mount body (204)) is structural element that forms a core to which one or more ring(s) (202A, 202B), a backrest (e.g., backrest (216)), a seat (e.g., seat (214)), one or more mount bracket(s) (not shown), one or more mount hole(s) (not shown), and/or a stand (not shown) may connect (i.e., mechanically attach, affix, fasten, etc.).

In one or more embodiments of the invention, a ring (e.g., ring A (202A), ring B (202B)) is a structural element adapted to allow the grip (not shown) of a handheld device (not shown) to pass, at least, partially therethrough. In one or more embodiments, a ring (202A, 202B) may be fully closed (i.e., forming a contiguous loop) or may be open-ended (see e.g., FIGS. 11A, 15A, 16A). Further, a ring (202A, 202B) may form any shape that would allow a grip of a handheld device to pass partially therethrough (e.g., circular, elliptical, triangular, square, rectangular, or any other multi-side polygon—regular or irregular—convex or concave, see FIGS. 8A, 11A, 14A). Further, for any of the potential shapes of a ring (202A, 202B), the corners of the ring (202A, 202B) may be rounded using any suitable curvature (or not rounded at all). In one or more embodiments of the invention, a ring (202A, 202B) includes a ring outer portion (e.g., ring outer portion A (203A), ring outer portion B (203B)).

In one or more embodiments of the invention, a ring outer portion (e.g., ring outer portion A (203A), ring outer portion B (203B)) is a portion of a ring (202A, 202B) that is that the distal ends of the mount (200) (i.e., the ends furthest from the center of the mount (200)).

In one or more embodiments of the invention, a backrest (e.g., backrest (216)) is a structural element that may support one or more portions of a handheld device (not shown). Additional details regarding the backrest (216) may be found in the description of FIGS. 3A-3B, 4A-4B, and 5A-5B.

In one or more embodiments of the invention, a seat (e.g., seat (214)) is a structural element that may support one or more portions of a handheld device (not shown). Additional details regarding the seat (214) may be found in the description of FIGS. 3A-3B, 4A-4B, and 5A-5B.

Figure 14A:
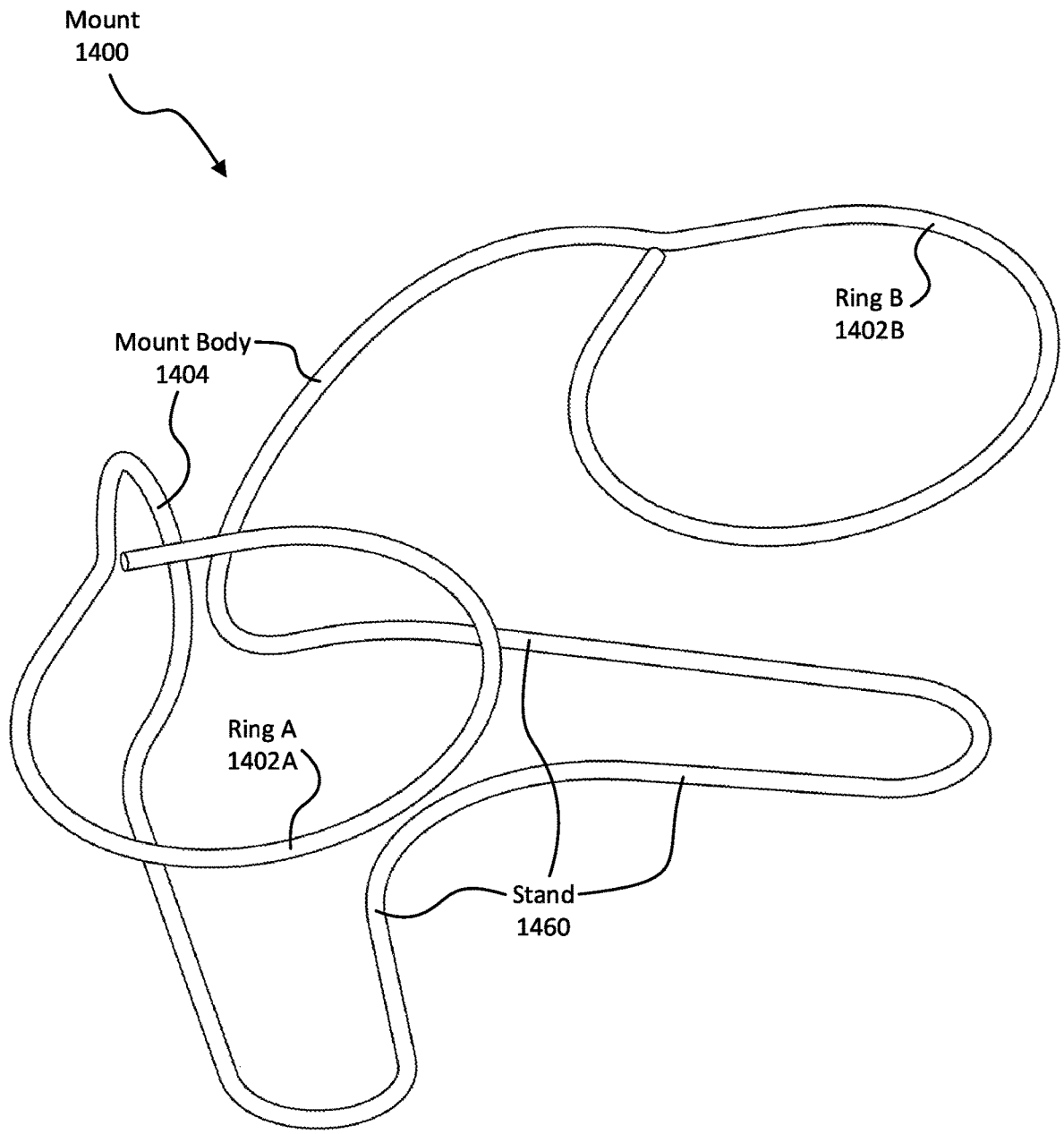
FIG. 14A shows an isometric view of an example of a mount, in accordance with one or more embodiments of the invention.

In one or more embodiments of the invention, a mount body (204), one or more ring(s) (ring A (202A), ring B (202B)), a backrest (216), a seat (214), a stand (not shown), one or more mount bracket(s) (not shown), one or more mount hole(s) (not shown), or any combination thereof may be constructed from a single material. For example, as shown in FIGS. 9A, 12A, and 14A, a single wire forms the entire mount. As another example, as shown in FIGS. 1B, 1D, 7A, 8A, 10A, 11A, 15A, and 16A, the mount may be made from a single material (the mount and mount body), whereas other parts (mount brackets) may be made from other materials and affixed to the mount.

While FIGS. 2A-2F show a specific configuration of a mount, other configurations may be used without departing from the scope of the invention. Accordingly, embodiments disclosed herein should not be limited to the configuration of devices and/or components shown in FIGS. 2A-2F.

FIGS. 3A-3B

Figure 3A:
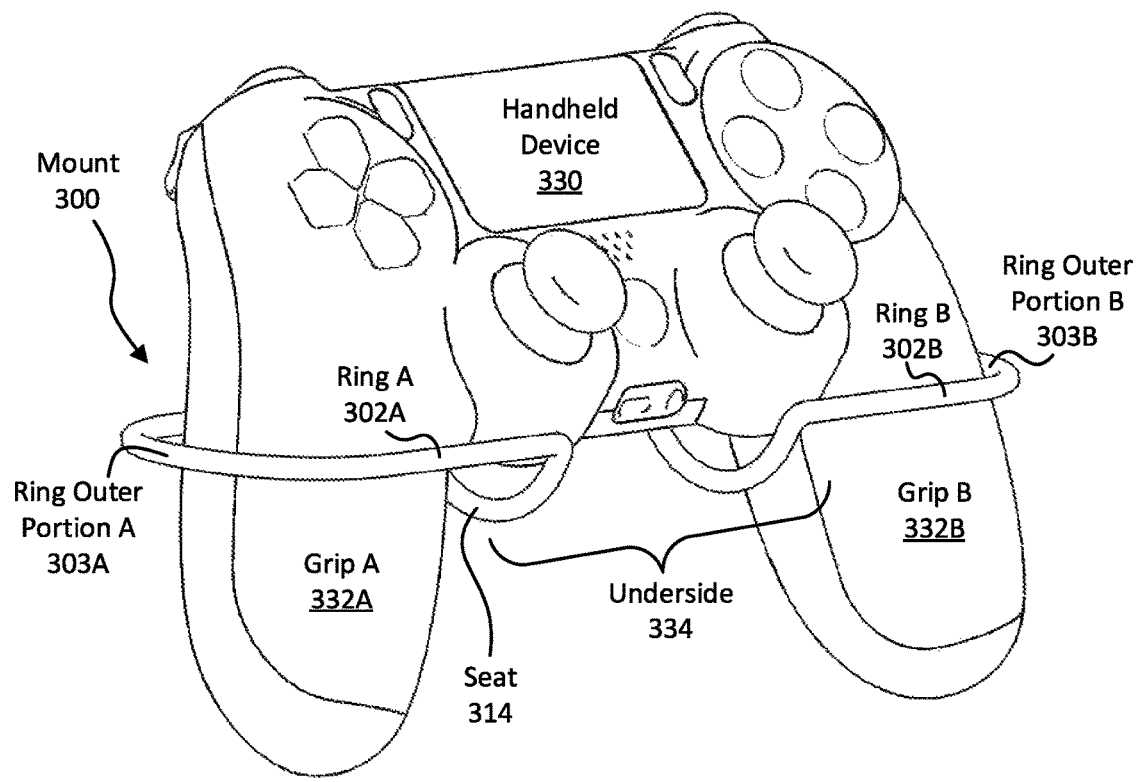
FIG. 3A shows a diagram of a mount and a handheld device, in accordance with one or more embodiments of the invention.
Figure 3B:
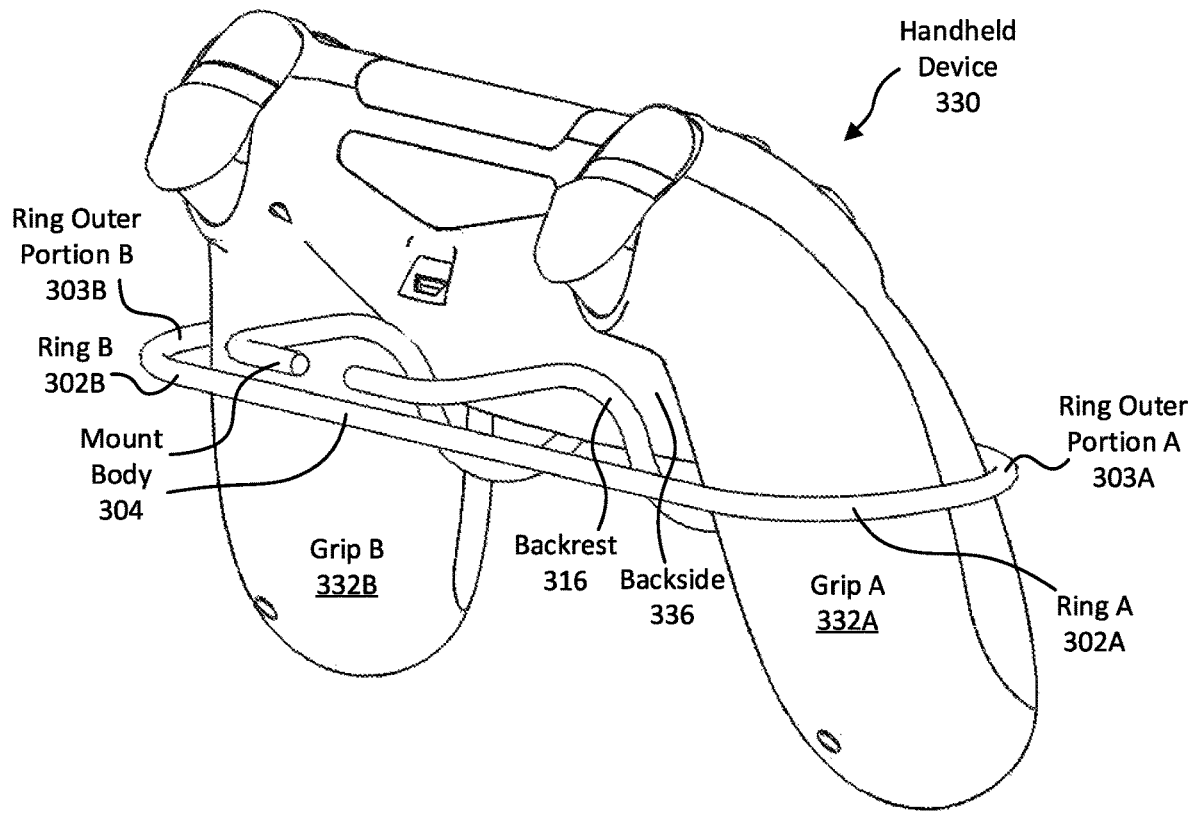
FIG. 3B shows a diagram of a mount and a handheld device, in accordance with one or more embodiments of the invention.

FIGS. 3A-3B show a diagram of a mount and a handheld device, in accordance with one or more embodiments of the invention. A mount (e.g., mount (300)) may be supporting a handheld device (e.g., handheld device (330)) via one or more ring(s) (e.g., ring A (302A), ring B (302B)). Similarly named components, shown in this figure, have all of the same properties and functionalities as described in previous figures. Accordingly, only additional components, properties, and functionalities will be described below.

In one or more embodiments of the invention, a handheld device (330) may include a central core, to which one or more grip(s) (e.g., grip A (332A), grip B (332B)) are connected. Further, the central core of the handheld device (330) may have an underside (e.g., underside (334)) and/or a backside (e.g., backside (336)).

In one or more embodiments of the invention, an underside (e.g., underside (334)) is a portion of the handheld device (330) that is adjacent to one or more grip(s) (e.g., grip A (332A), grip B (332B)) or disposed between two or more grips (i.e., grip A (332A) and grip B (332B)). When sitting in the mount (300), the underside (334) may contact, and be supported by, the seat (314) and/or one or more ring(s) (302A, 302B) thereby preventing the handheld device (330) from descending further into the mount (300). The underside (334) may be the lowest (non-grip) portion of the handheld device (330) when sitting in a mount (300). In one or more embodiments of the invention, the handheld device (330) (and the underside (334) thereof) may not contact the seat (314) at all.

In one or more embodiments of the invention, a backside (e.g., backside (336)) is a portion of the handheld device (330) generally opposite the button inputs of the handheld device (330) (if present). When sitting in the mount (300), the backside (336) may contact the backrest (316) thereby preventing the handheld device (330) from angling further backwards. In one or more embodiments of the invention, the handheld device (330) (and the backside (336) thereof) may not contact the backrest (316) at all.

In one or more embodiments of the invention, a grip (e.g., grip A (332A), grip B (332B)) is a portion of the handheld device (330) that is intended to be held in the hand of a human user (not shown). A grip (332A, 332B) may protrude from the handheld device (330) to allow a human to grasp the grip (332A, 332B) by wrapping their palm and one or more finger(s) around the grip (332A, 332B). In one or more embodiments of the invention, if two or more grips (332A, 332B) are on the handheld device (330), the grips (332A, 332B) may protrude from the central core of the handheld device (330) in the same general direction (i.e., within 100° of each other).

As shown in FIGS. 3A-3B, in one or more embodiments of the invention, a handheld device (330) sits in a mount (300) by inserting two grips (i.e., grip A (332A), grip B (332B)) into two rings (i.e., ring A (302A), ring B (302B)), respectively. The handheld device (330) may contact the rings (302A, 302B) on one or more grips (332A, 332B), on the underside (334), at the concave corner where the grips (332A, 332B) meet the underside (334), or some combination thereof.

In one or more embodiments of the invention, the handheld device (330) may be placed into the mount (300) by lowering the grips (332A, 332B) into each respective ring (302A, 302B). Once placed in the mount (300), the handheld device (330) may sit sufficiently such that lateral movements of the handheld device (330) are limited by the ring outer portions (303A, 303B). That is, the handheld device (330) cannot be pushed laterally to either side (left or right) to remove the handheld device (330) from the mount (300). For example, when pushed leftward, grip A (332A) would come into contact with ring outer portion A (303A) thereby preventing further motion (or grip B (332B) would contact seat (314) preventing the same motion). Alternatively, as another example, when pushed rightward, grip B (332B) would come into contact with ring outer portion B (303B) thereby preventing further motion (or grip A (332A) would contact seat (314) preventing the same motion). Rather, to unmount the handheld device (330), an upward force is required (opposite of the insertion direction) in order to detach the handheld device (330) from the mount (300).

Further, in one or more embodiments of the invention, while the handheld device (330) is seated in the mount (300), the handheld device (330) maintains the same relative position within the mount (300) due to gravity. That is, the grips (332A, 332B) maintain a position within the rings (302A, 302B) via gravity exerting a constant downward force on the handheld device (330).

In one or more embodiments of the invention, the handheld device (330) may be held at stable equilibrium via multiple contact points between each grip (grip A (332A) and grip B (332B)) and each respective ring (ring A (302A) and ring B (302B)). As an example, a middle (or lower) front portion of each grip (grip A (332A) and grip B (332B)) may contact the front portion of each ring (ring A (302A) and ring B (302B)). Further, an upper back portion of each grip (grip A (332A) and grip B (332B)) may contact the back portion of each ring (ring A (302A) and ring B (302B), where the mount body (304) connects). Accordingly, the handheld device (330) is held in stable equilibrium via three or four points of contact with the mount (300).

While FIGS. 3A-3B show a specific configuration of a mount, other configurations may be used without departing from the scope of the invention. Accordingly, embodiments disclosed herein should not be limited to the configuration of devices and/or components shown in FIGS. 3A-3B.

FIG. 3C

Figure 3C:
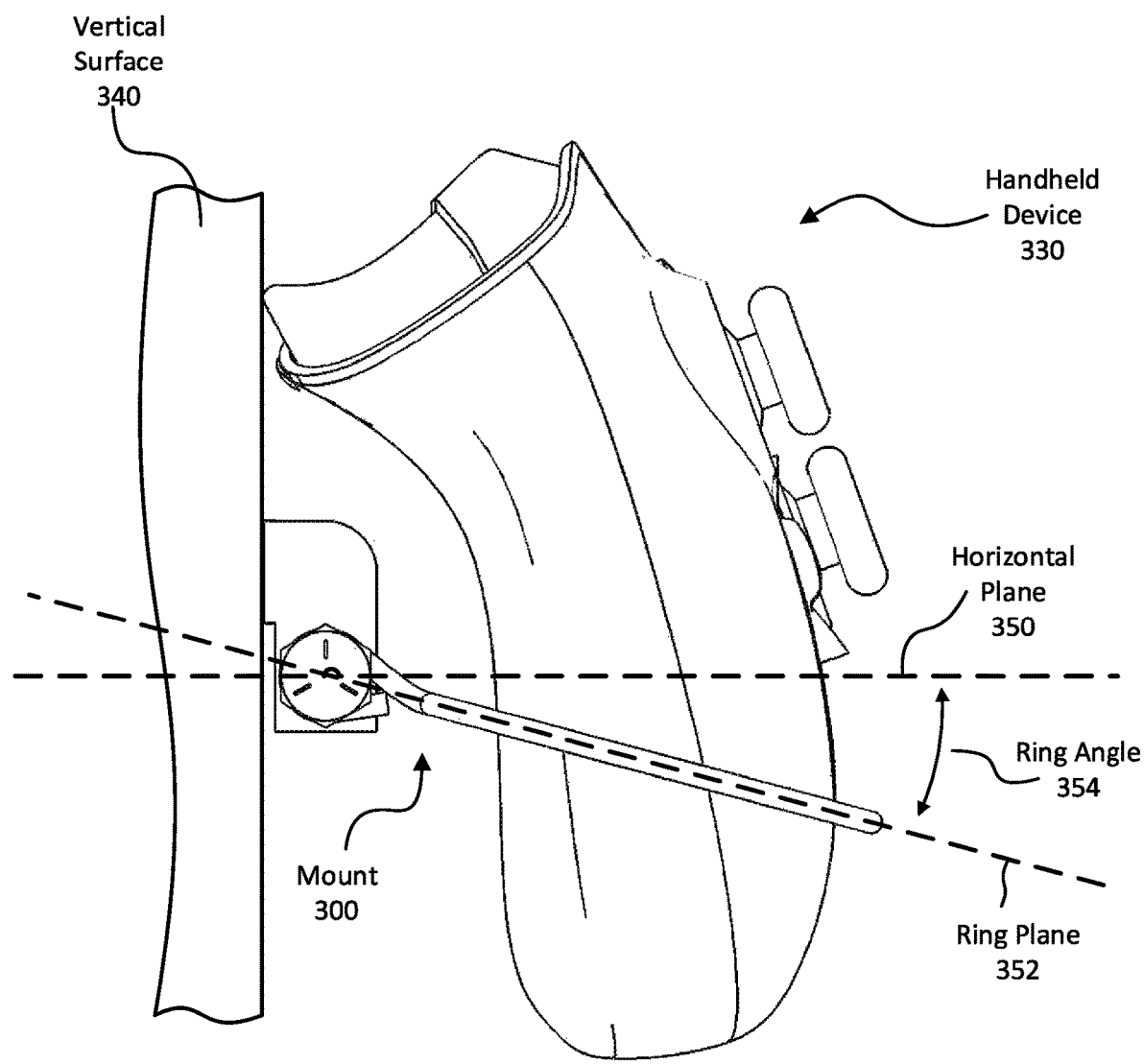
FIG. 3C shows a diagram of a mount and a handheld device, in accordance with one or more embodiments of the invention.

FIG. 3C shows a diagram of a mount and a handheld device, in accordance with one or more embodiments of the invention. Similarly named components, shown in this figure, have all of the same properties and functionalities as described in previous figures. Accordingly, only additional components, properties, and functionalities will be described below.

From a side view, as shown in FIG. 3C, in one or more embodiments of the invention, a handheld device (330) is angled towards the vertical surface (340) (i.e., the top of the handheld device (330) is closer to the vertical surface (340) than the bottom of the handheld device (330)). Further, as shown in FIG. 3C, the handheld device (330) may also contact the vertical surface (340)—in addition to one or more portions of the mount (300).

Although not shown in FIG. 3C, the handheld device (330) may also contact the mount bracket without contacting the vertical surface (340), or the handheld device (330) may contact both the mount bracket and the vertical surface (340). Alternatively, in one or more embodiments of the invention, the handheld device (330) may contact only the rings of the mount (300). That is, the rings of the mount (300) may sufficiently constrain the grips of the handheld device (330) such that the handheld device (330) in unable to lean backwards towards the vertical surface (340) due to the physical constraints placed on the grips.

In one or more embodiments of the invention, a horizontal plane (e.g., horizontal plane (350)) is a plane that is substantially parallel to a horizontal surface and/or orthogonal to a vertical surface (340). In one or more embodiments of the invention, a ring plane (e.g., ring plane (352)) is a plane that intersects one or more ring(s) and is coincident with the opening formed by the ring's structure (the opening through which a grip passes through).

In one or more embodiments of the invention, a ring angle (e.g., ring angle (354)) is an angle that exists between the horizontal plane (350) and the ring plane (352). In one or more embodiments of the invention, the line where the horizontal plane (350) and vertical surface (340) intersect is parallel to the line where the ring plane (352) and vertical surface (340) intersect. In one or more embodiments of the invention, the ring angle (354) may be adjustable by a user, or the ring angle (354) may be fixed (e.g., set during construction/fabrication of the mount (300)).

While FIG. 3C shows a specific configuration of a mount, other configurations may be used without departing from the scope of the invention. Accordingly, embodiments disclosed herein should not be limited to the configuration of devices and/or components shown in FIG. 3C.

FIGS. 4A-4B

Figure 4A:
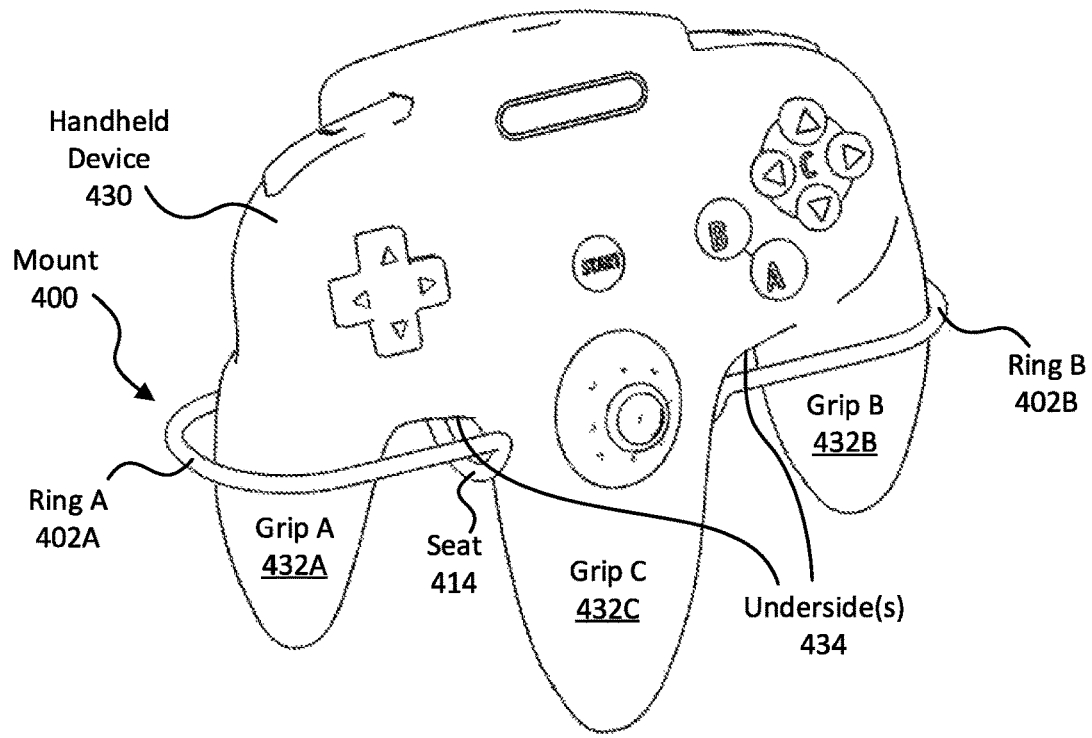
FIG. 4A shows a diagram of a mount and a handheld device, in accordance with one or more embodiments of the invention.
Figure 4B:
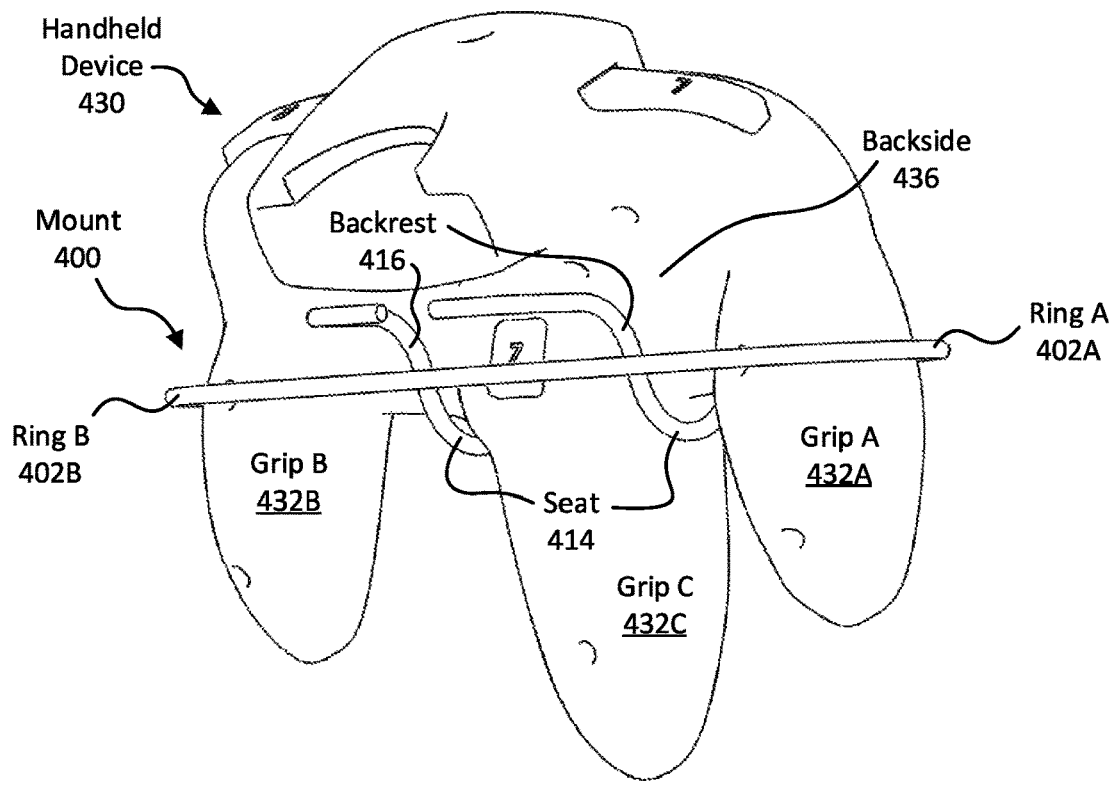
FIG. 4B shows a diagram of a mount and a handheld device, in accordance with one or more embodiments of the invention.

FIGS. 4A-4B show a diagram of a mount and a handheld device, in accordance with one or more embodiments of the invention. Similarly named components, shown in this figure, have all of the same properties and functionalities as described in previous figures. Accordingly, only additional components, properties, and functionalities will be described below.

In one or more embodiments of the invention, a handheld device (430) may include a third grip (e.g., grip C (432C)) disposed between two other grips (grip A (432A) and grip B (432B)). Further, the rings (ring A (402A) and ring B (402B)) (and the mount (400), as a whole) are still capable of accepting the handheld device (430) as grip C (432C) is unobstructed by any portion of the mount (the volume between ring A (402A) and ring B (402B) is unoccupied). That is, the mount is adapted to support a handheld device (430) with a third grip (grip C (432C)). In one or more embodiments of the invention, the mount may minimally contact (or not contact at all) the third grip (grip C (432C)) as the third grip (grip C (432C)) passes between the rings (ring A (402A) and ring B (402B)) unobstructed.

In one or more embodiments of the invention, where the handheld device (430) includes a third grip (grip C (432C)), the underside (e.g., underside(s) (434)) may be broken into two or more undersides (434) disposed between each of the pairs of grips (grip A (432A), grip C (432C) and grip C (432C), grip B (432B)). Similar to FIGS. 4A-4B, when sitting in the mount (400), the undersides (434) may contact, and be supported by, the seat (414) and/or one or more ring(s) (402A, 402B) thereby preventing the handheld device (430) from descending further into the mount (400). Further, when sitting in the mount (400), the backside (436) may contact the backrest (416) thereby preventing the handheld device (430) from angling further backwards.

While FIGS. 4A-4B shows a specific configuration of a mount, other configurations may be used without departing from the scope of the invention. Accordingly, embodiments disclosed herein should not be limited to the configuration of devices and/or components shown in FIGS. 4A-4B.

FIGS. 5A-5B

Figure 5A:
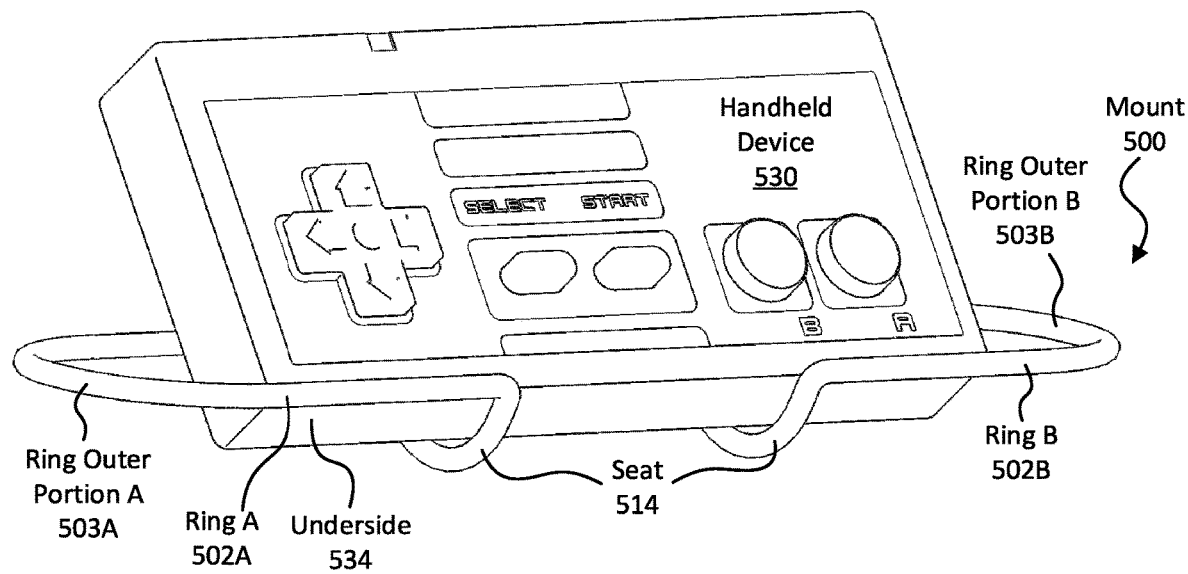
FIG. 5A shows a diagram of a mount and a handheld device, in accordance with one or more embodiments of the invention.
Figure 5B:
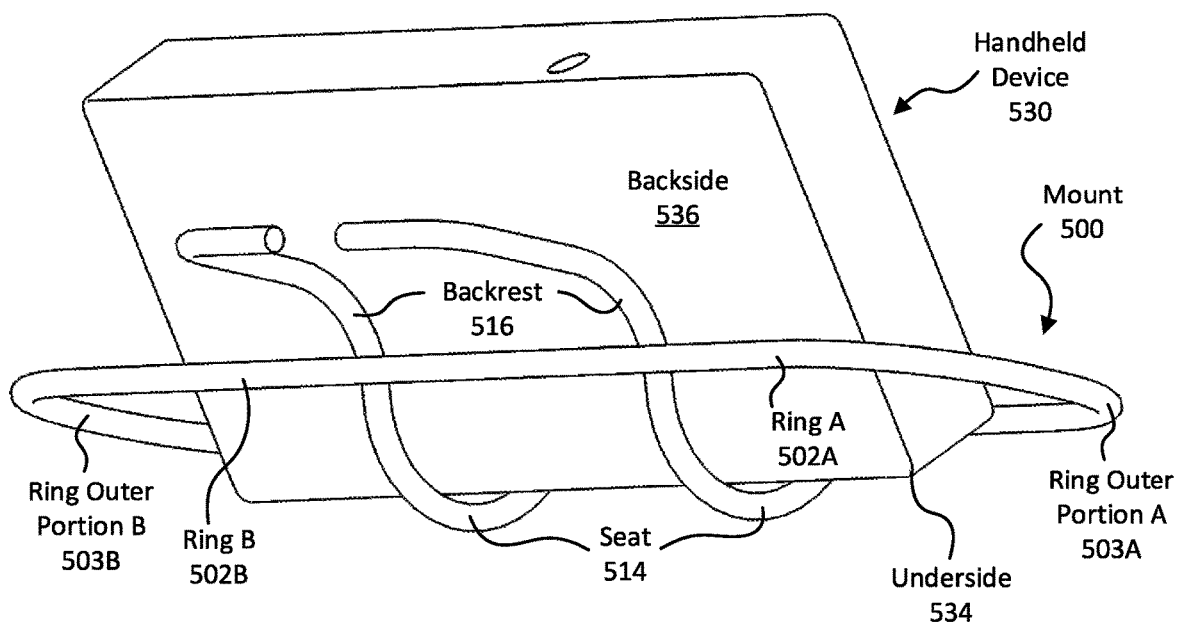
FIG. 5B shows a diagram of a mount and a handheld device, in accordance with one or more embodiments of the invention.

FIGS. 5A-5B show a diagram of a mount and a handheld device, in accordance with one or more embodiments of the invention. Similarly named components, shown in this figure, have all of the same properties and functionalities as described in previous figures. Accordingly, only additional components, properties, and functionalities will be described below.

In one or more embodiments of the invention, a handheld device (530) may not include any grips. Yet, the mount (500) is still adapted to support the handheld device (530) via the seat (514) and/or the backrest (516). That is, in one or more embodiments of the invention, the underside (534) may contact the mount (500) via the seat (514) and the backside (536) may contact the mount (500) via the backrest (516).

Further, in one or more embodiments of the invention, the handheld device (530) is prevented from unmounting from the mount (500) via lateral movements (left or right) as the ring outer portions (503A, 503B) prevent the handheld device (530) from moving too far in either direction and falling from the mount (500). For example, when pushed leftward, the handheld device (530) would come into contact with ring outer portion A (503A) thereby preventing further motion. Alternatively, as another example, when pushed rightward, the handheld device (530) would come into contact with ring outer portion B (503B) thereby preventing further motion. Rather, to unmount the handheld device (530), an upward force is required (opposite of the insertion direction) in order to detach the handheld device (530) from the mount (500).

In one or more embodiments of the invention, the handheld device (530) maintains the same relative position within the mount (500) due to gravity. That is, the underside (534) maintains a position against the seat (514) via gravity exerting a constant downward force on the handheld device (530).

While FIGS. 5A-5B shows a specific configuration of a mount, other configurations may be used without departing from the scope of the invention. Accordingly, embodiments disclosed herein should not be limited to the configuration of devices and/or components shown in FIGS. 5A-5B.

FIGS. 6A-F

Figure 6A:
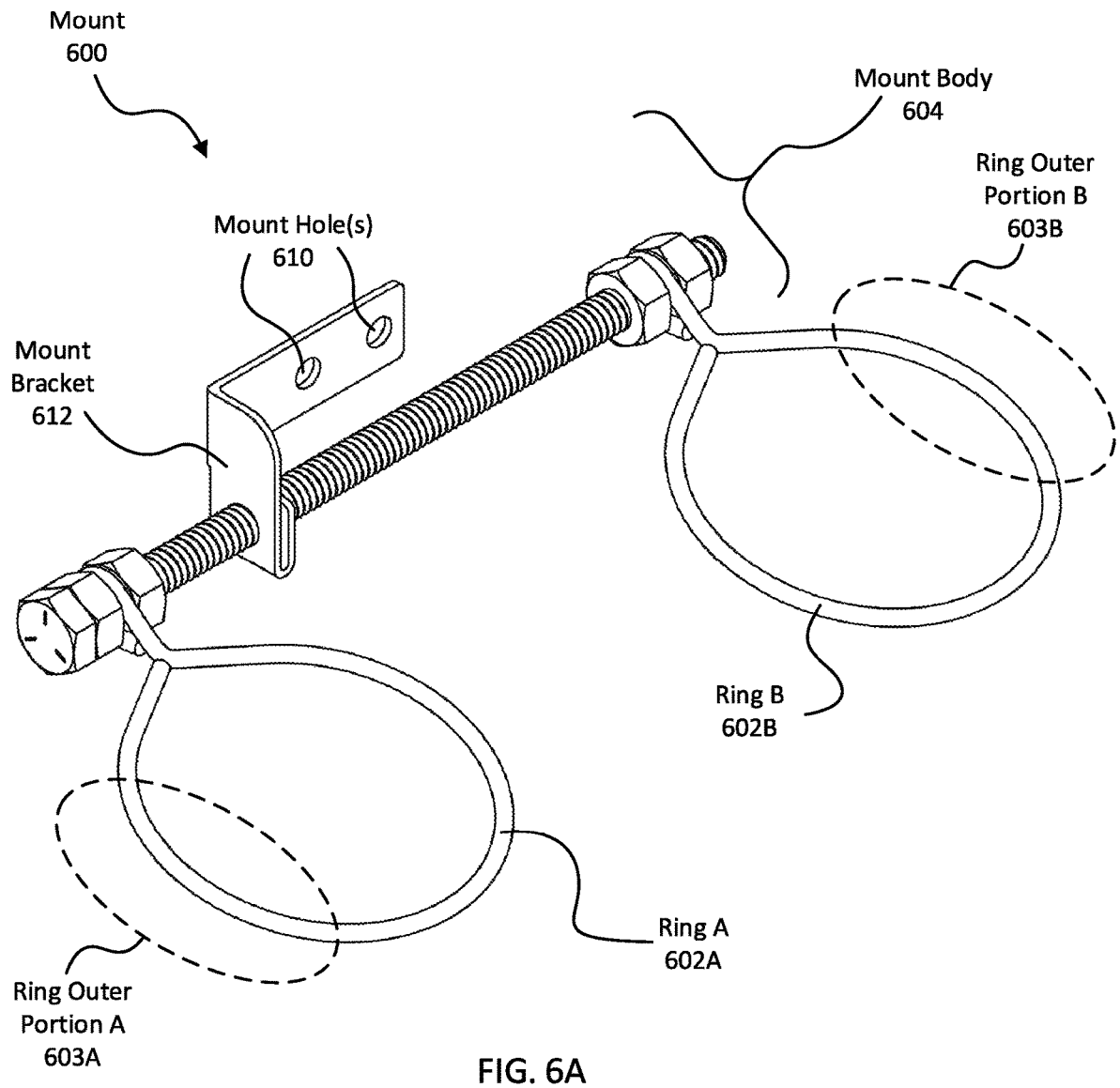
FIG. 6A shows an isometric view of an example of a mount, in accordance with one or more embodiments of the invention.

FIG. 6A shows an example of a mount, in accordance with one or more embodiments of the invention. Similarly named components, shown in this figure, have all of the same properties and functionalities as described in previous figures.

A mount (600) may include a mount body (604) and one or more ring(s) (ring A (602A), ring B (602B)). The ring(s) (602A, 602B) may include one or more ring outer portion(s) (e.g., ring outer portion A (603A), ring outer portion B (603B)). The mount body (604) may include one or more mount bracket(s) (612) and one or more mount hole(s) (610).

While FIG. 6A shows a specific configuration of a mount, other configurations may be used without departing from the scope of the invention. Accordingly, embodiments disclosed herein should not be limited to the configuration of devices and/or components shown in FIG. 6A.

Figure 6B:
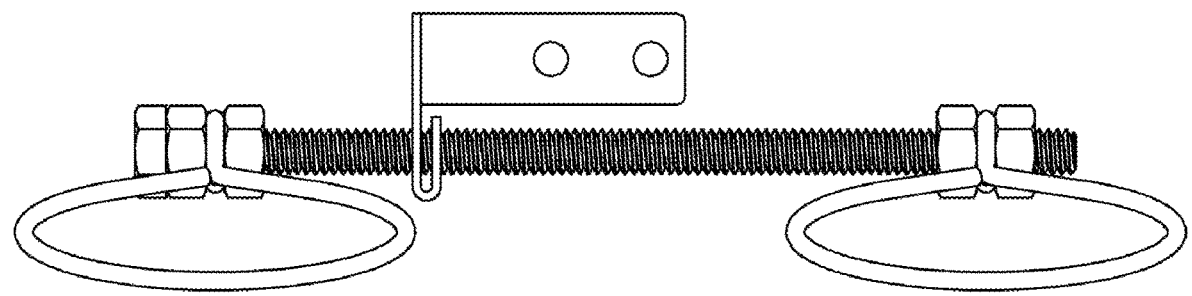
FIG. 6B shows a front view of the example mount shown in FIG. 6A, in accordance with one or more embodiments of the invention.

FIG. 6B shows a front view of the example mount shown in FIG. 6A, in accordance with one or more embodiments of the invention.

Figure 6C:
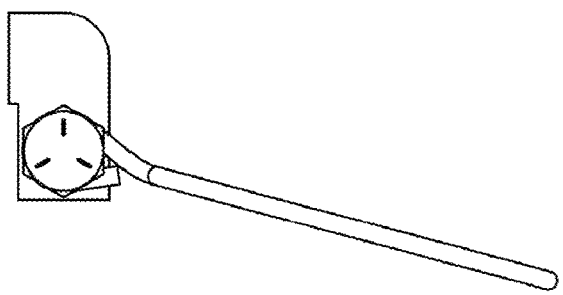
FIG. 6C shows a left view of the example mount shown in FIG. 6A, in accordance with one or more embodiments of the invention.

FIG. 6C shows a left view of the example mount shown in FIG. 6A, in accordance with one or more embodiments of the invention.

Figure 6D:
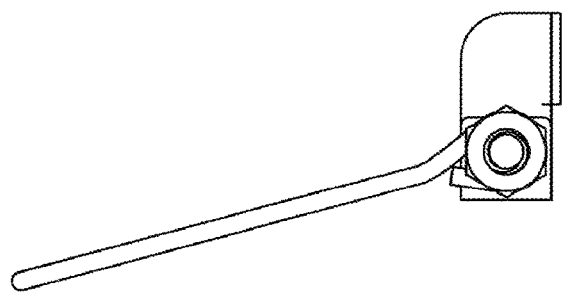
FIG. 6D shows a right view of the example mount shown in FIG. 6A, in accordance with one or more embodiments of the invention.

FIG. 6D shows a right view of the example mount shown in FIG. 6A, in accordance with one or more embodiments of the invention.

Figure 6E:
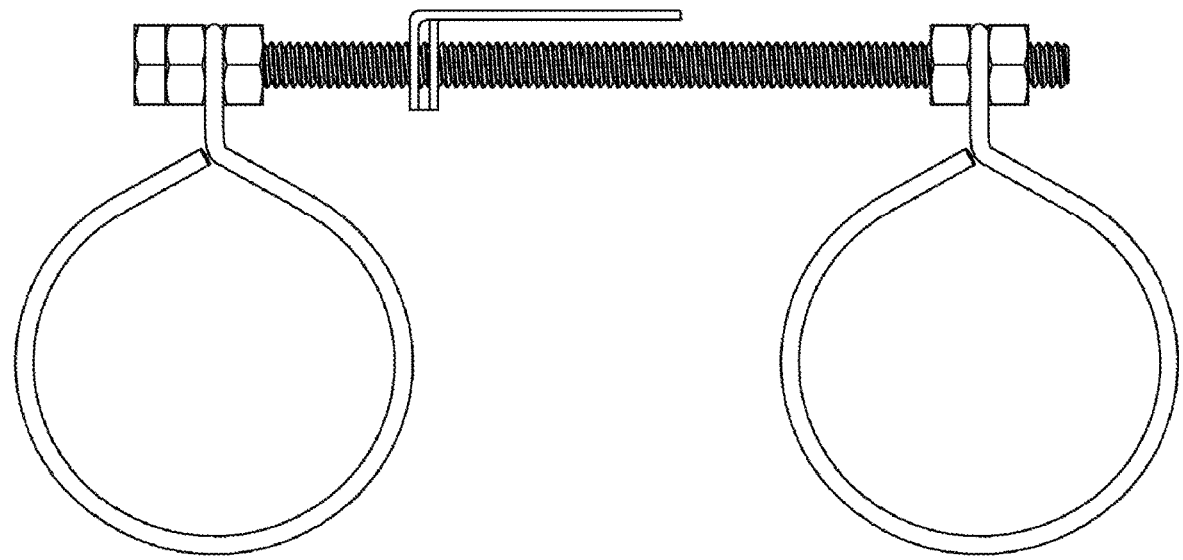
FIG. 6E shows a top view of the example mount shown in FIG. 6A, in accordance with one or more embodiments of the invention.

FIG. 6E shows a top view of the example mount shown in FIG. 6A, in accordance with one or more embodiments of the invention.

Figure 6F:
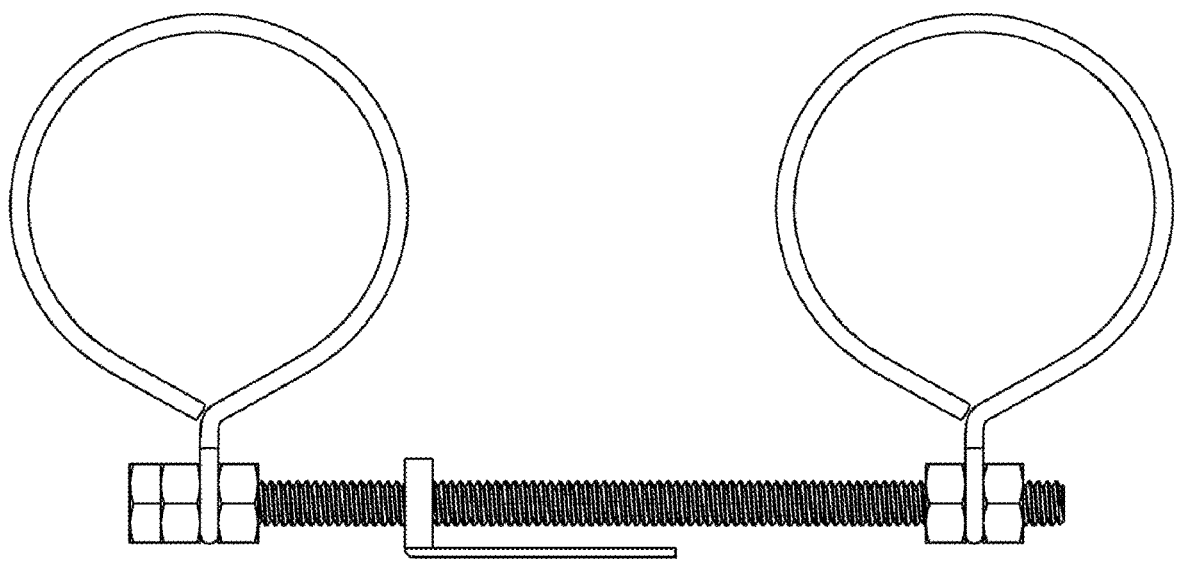
FIG. 6F shows a bottom view of the example mount shown in FIG. 6A, in accordance with one or more embodiments of the invention.

FIG. 6F shows a bottom view of the example mount shown in FIG. 6A, in accordance with one or more embodiments of the invention.

FIGS. 7A-F

Figure 7A:
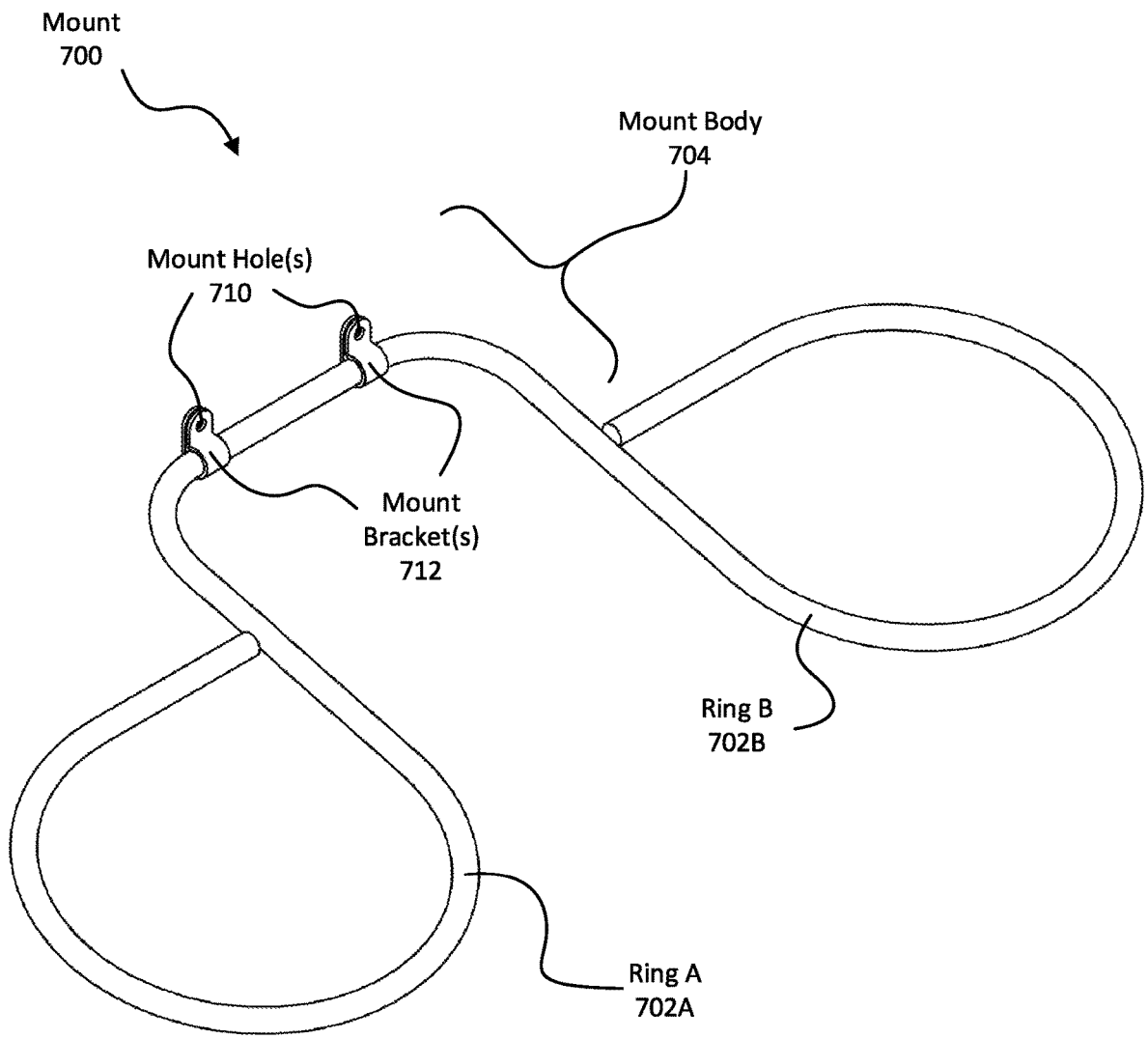
FIG. 7A shows an isometric view of an example of a mount, in accordance with one or more embodiments of the invention.

FIG. 7A shows an example of a mount, in accordance with one or more embodiments of the invention. Similarly named components, shown in this figure, have all of the same properties and functionalities as described in previous figures.

A mount (700) may include a mount body (704) and one or more ring(s) (ring A (702A), ring B (702B)). The mount body (704) may include one or more mount bracket(s) (712) and one or more mount hole(s) (710).

While FIG. 7A shows a specific configuration of a mount, other configurations may be used without departing from the scope of the invention. Accordingly, embodiments disclosed herein should not be limited to the configuration of devices and/or components shown in FIG. 7A.

Figure 7B:
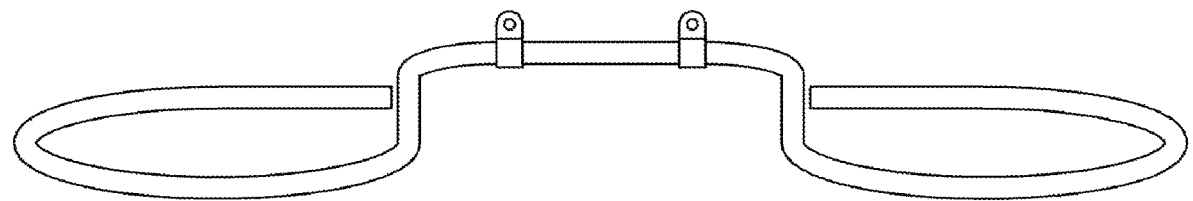
FIG. 7B shows a front view of the example mount shown in FIG. 7A, in accordance with one or more embodiments of the invention.

FIG. 7B shows a front view of the example mount shown in FIG. 7A, in accordance with one or more embodiments of the invention.

Figure 7C:
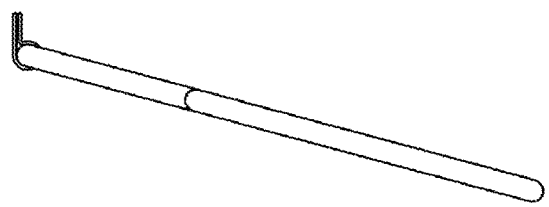
FIG. 7C shows a left view of the example mount shown in FIG. 7A, in accordance with one or more embodiments of the invention.

FIG. 7C shows a left view of the example mount shown in FIG. 7A, in accordance with one or more embodiments of the invention.

Figure 7D:
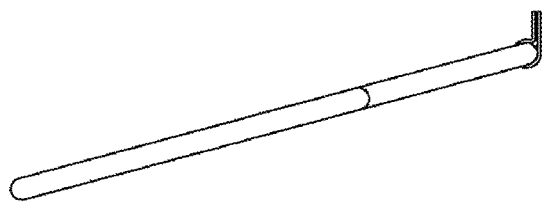
FIG. 7D shows a right view of the example mount shown in FIG. 7A, in accordance with one or more embodiments of the invention.

FIG. 7D shows a right view of the example mount shown in FIG. 7A, in accordance with one or more embodiments of the invention.

Figure 7E:
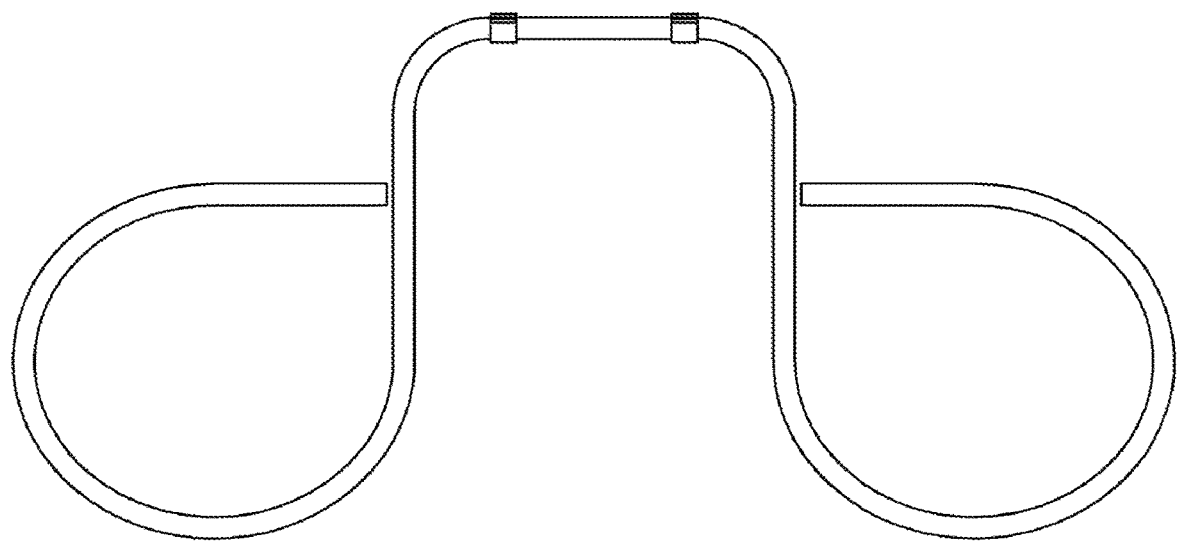
FIG. 7E shows a top view of the example mount shown in FIG. 7A, in accordance with one or more embodiments of the invention.

FIG. 7E shows a top view of the example mount shown in FIG. 7A, in accordance with one or more embodiments of the invention.

Figure 7F:
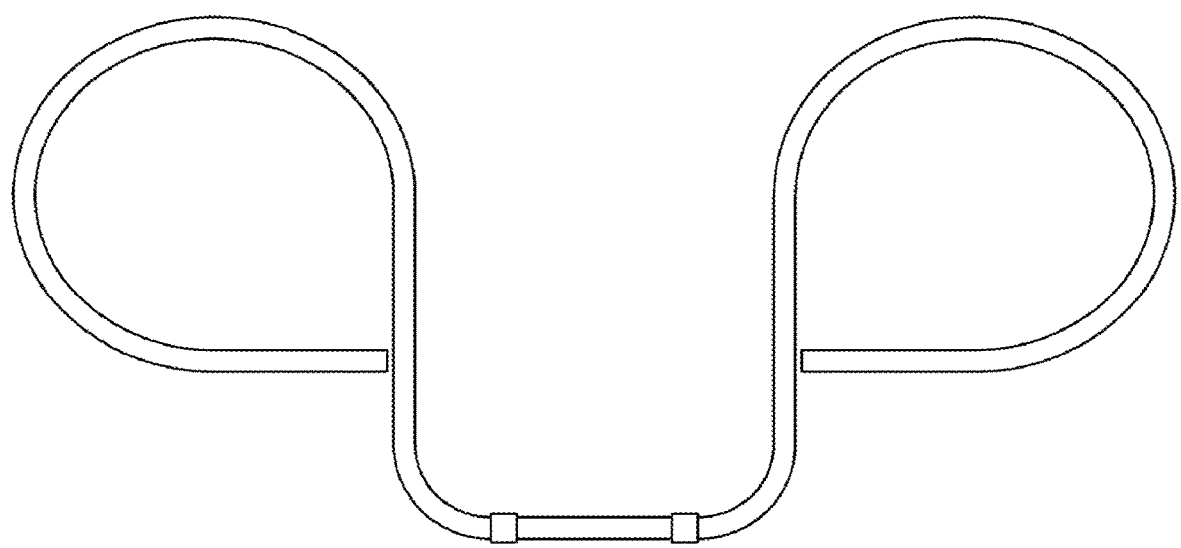
FIG. 7F shows a bottom view of the example mount shown in FIG. 7A, in accordance with one or more embodiments of the invention.

FIG. 7F shows a bottom view of the example mount shown in FIG. 7A, in accordance with one or more embodiments of the invention.

FIGS. 8A-F

Figure 8A:
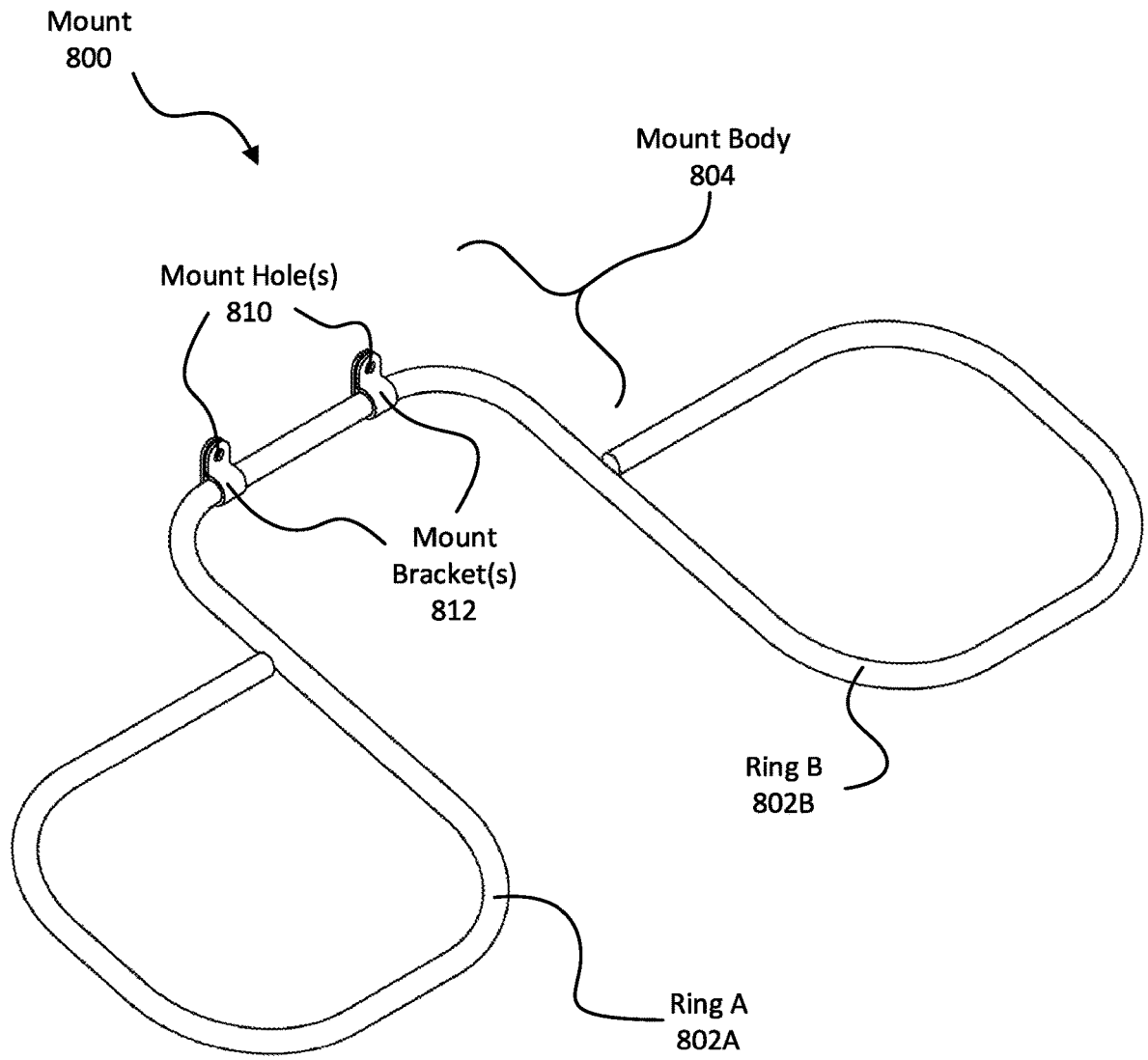
FIG. 8A shows an isometric view of an example of a mount, in accordance with one or more embodiments of the invention.
Figure 9A:
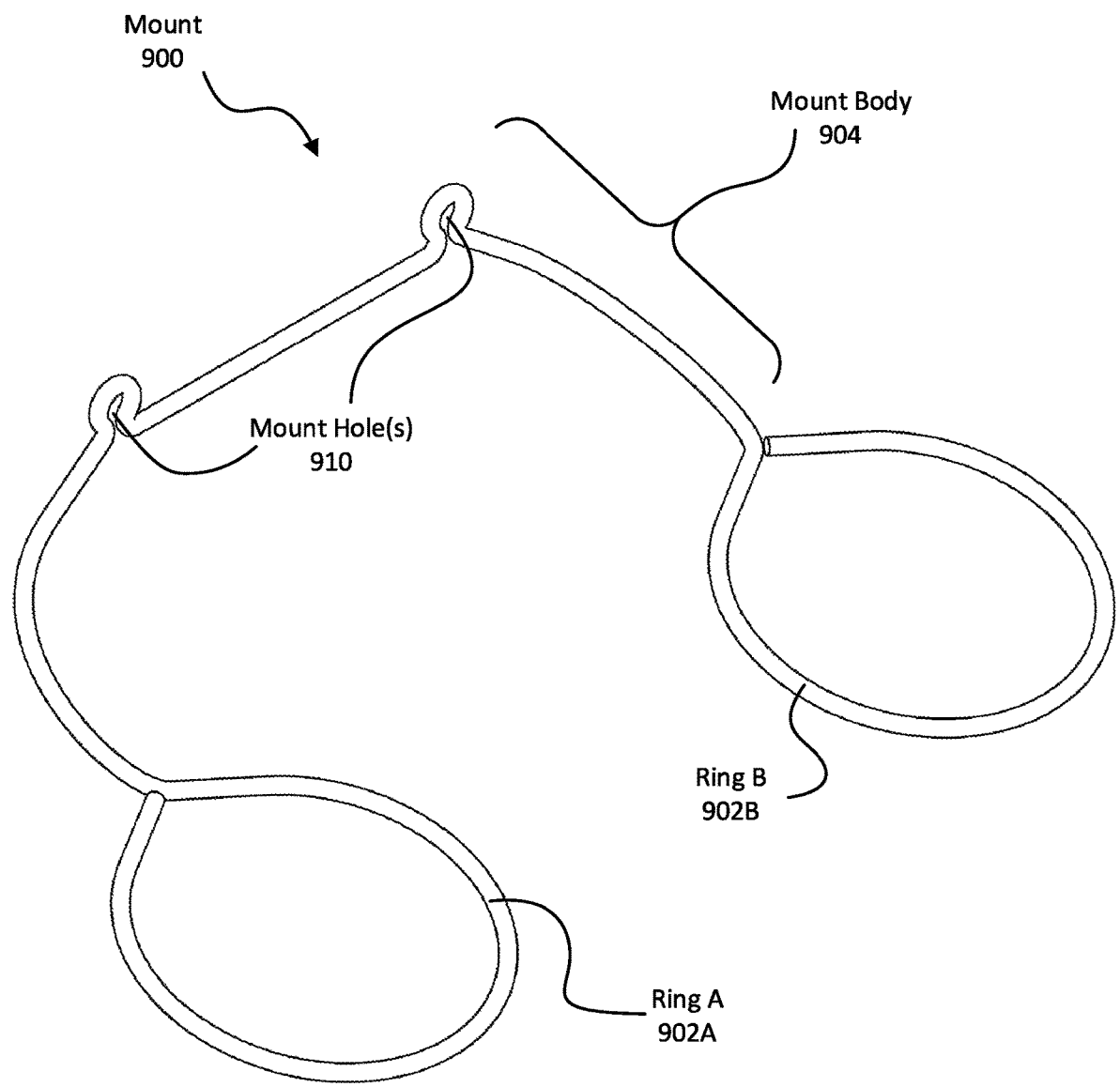
FIG. 9A shows an isometric view of an example of a mount, in accordance with one or more embodiments of the invention.

FIG. 8A shows an example of a mount, in accordance with one or more embodiments of the invention. Similarly named components, shown in this figure, have all of the same properties and functionalities as described in previous figures.

A mount (800) may include a mount body (804) and one or more ring(s) (ring A (802A), ring B (802B)). The mount body (804) may include one or more mount bracket(s) (812) and one or more mount hole(s) (810).

While FIG. 8A shows a specific configuration of a mount, other configurations may be used without departing from the scope of the invention. Accordingly, embodiments disclosed herein should not be limited to the configuration of devices and/or components shown in FIG. 8A.

Figure 8B:
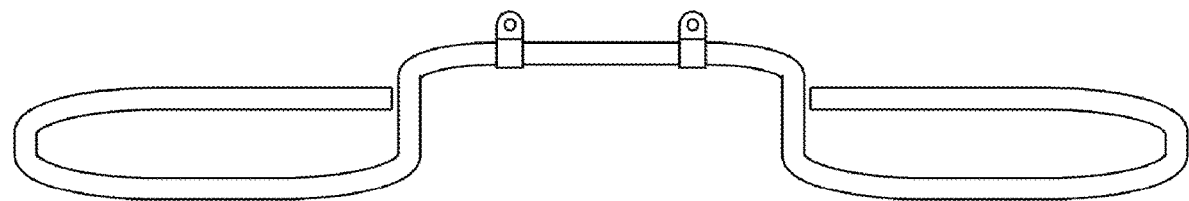
FIG. 8B shows a front view of the example mount shown in FIG. 8A, in accordance with one or more embodiments of the invention.

FIG. 8B shows a front view of the example mount shown in FIG. 8A, in accordance with one or more embodiments of the invention.

Figure 8C:
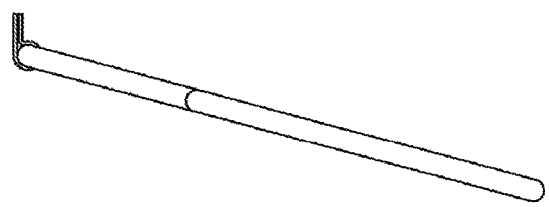
FIG. 8C shows a left view of the example mount shown in FIG. 8A, in accordance with one or more embodiments of the invention.

FIG. 8C shows a left view of the example mount shown in FIG. 8A, in accordance with one or more embodiments of the invention.

Figure 8D:
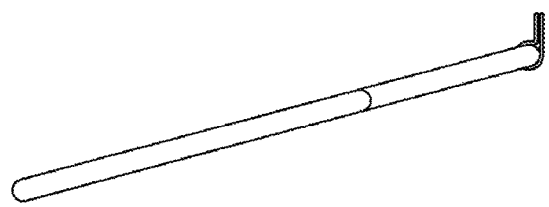
FIG. 8D shows a right view of the example mount shown in FIG. 8A, in accordance with one or more embodiments of the invention.

FIG. 8D shows a right view of the example mount shown in FIG. 8A, in accordance with one or more embodiments of the invention.

Figure 8E:
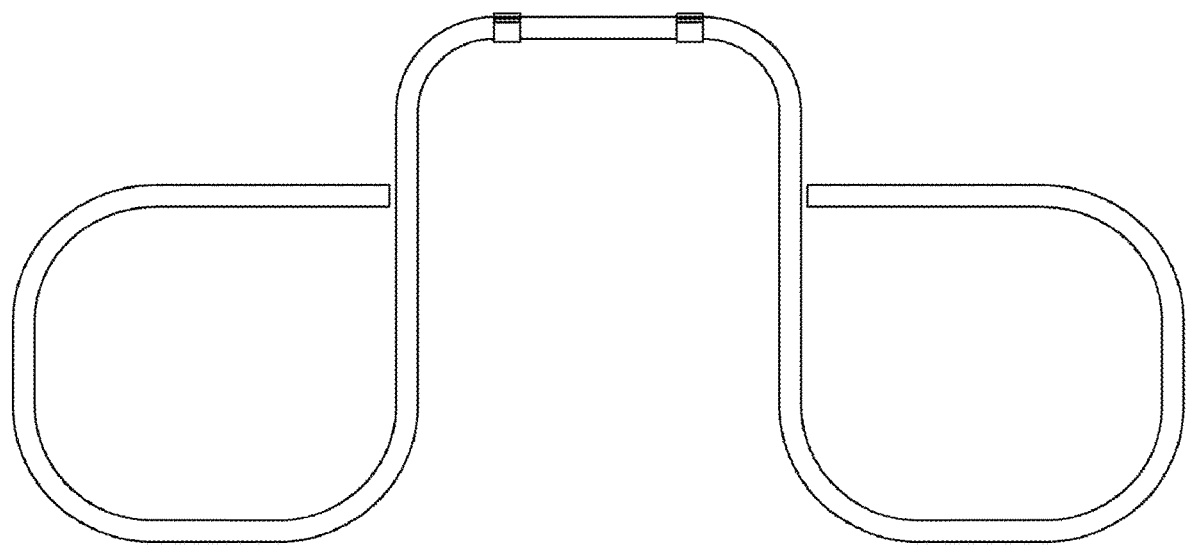
FIG. 8E shows a top view of the example mount shown in FIG. 8A, in accordance with one or more embodiments of the invention.

FIG. 8E shows a top view of the example mount shown in FIG. 8A, in accordance with one or more embodiments of the invention.

Figure 8F:
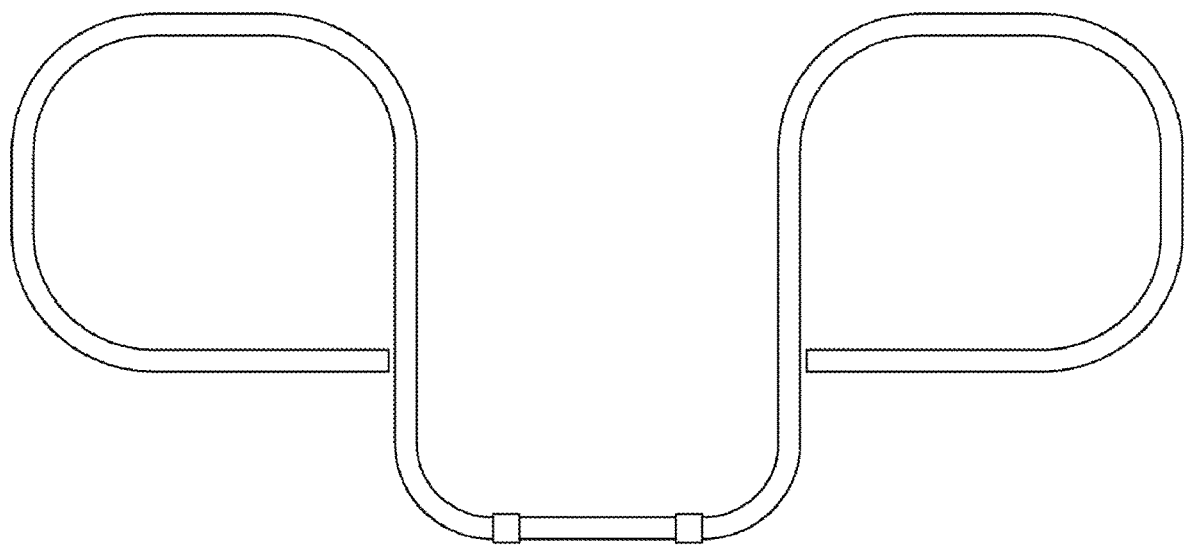
FIG. 8F shows a bottom view of the example mount shown in FIG. 8A, in accordance with one or more embodiments of the invention.

FIG. 8F shows a bottom view of the example mount shown in FIG. 8A, in accordance with one or more embodiments of the invention.

FIGS. 9A-F

FIG. 9A shows an example of a mount, in accordance with one or more embodiments of the invention. Similarly named components, shown in this figure, have all of the same properties and functionalities as described in previous figures.

A mount (900) may include a mount body (904) and one or more ring(s) (ring A (902A), ring B (902B)). The mount body (904) may include one or more mount hole(s) (910).

While FIG. 9A shows a specific configuration of a mount, other configurations may be used without departing from the scope of the invention. Accordingly, embodiments disclosed herein should not be limited to the configuration of devices and/or components shown in FIG. 9A.

Figure 9B:
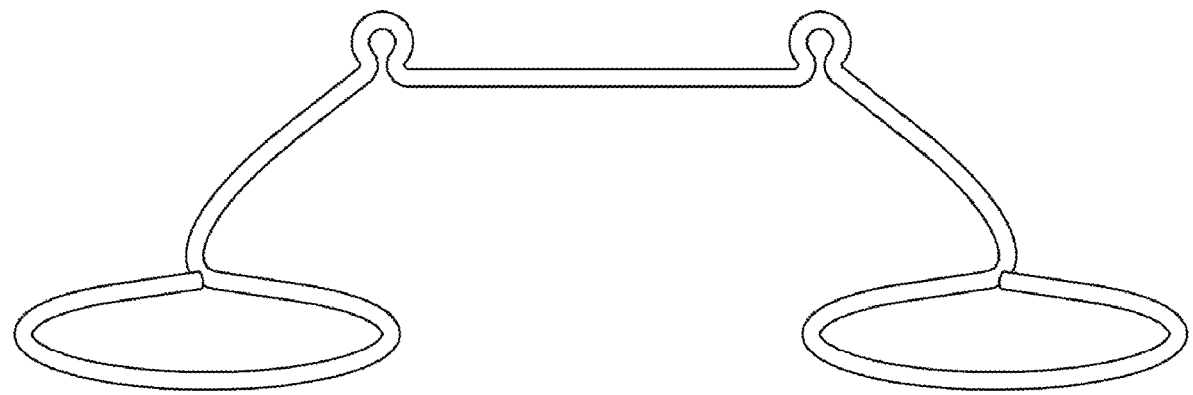
FIG. 9B shows a front view of the example mount shown in FIG. 9A, in accordance with one or more embodiments of the invention.

FIG. 9B shows a front view of the example mount shown in FIG. 9A, in accordance with one or more embodiments of the invention.

Figure 9C:
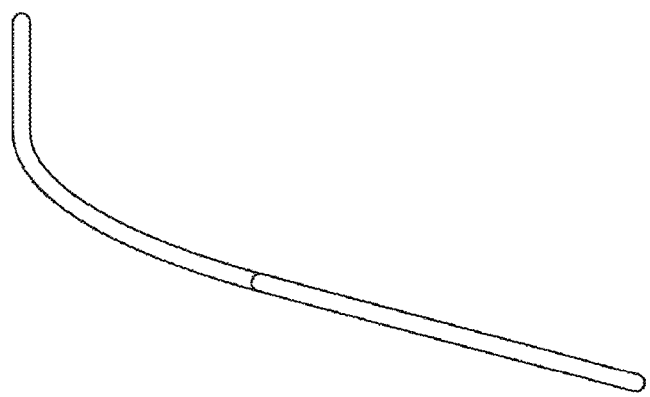
FIG. 9C shows a left view of the example mount shown in FIG. 9A, in accordance with one or more embodiments of the invention.

FIG. 9C shows a left view of the example mount shown in FIG. 9A, in accordance with one or more embodiments of the invention.

Figure 9D:
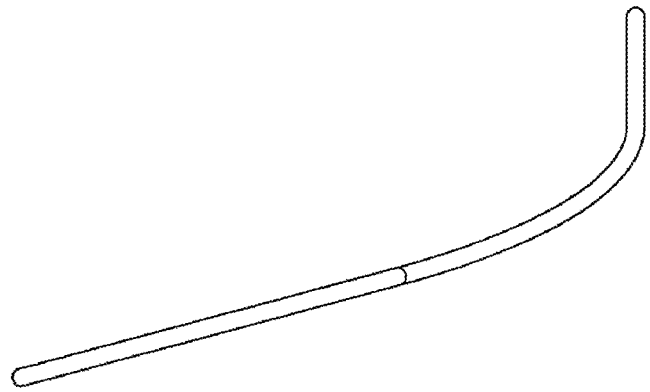
FIG. 9D shows a right view of the example mount shown in FIG. 9A, in accordance with one or more embodiments of the invention.

FIG. 9D shows a right view of the example mount shown in FIG. 9A, in accordance with one or more embodiments of the invention.

Figure 9E:
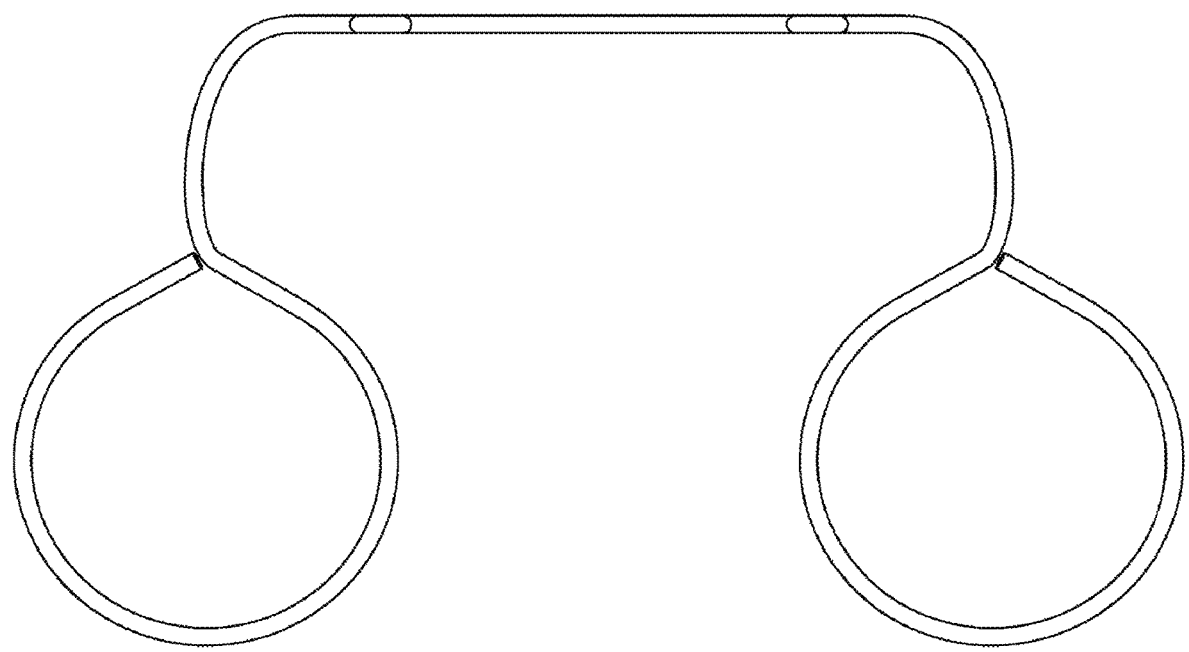
FIG. 9E shows a top view of the example mount shown in FIG. 9A, in accordance with one or more embodiments of the invention.

FIG. 9E shows a top view of the example mount shown in FIG. 9A, in accordance with one or more embodiments of the invention.

Figure 9F:
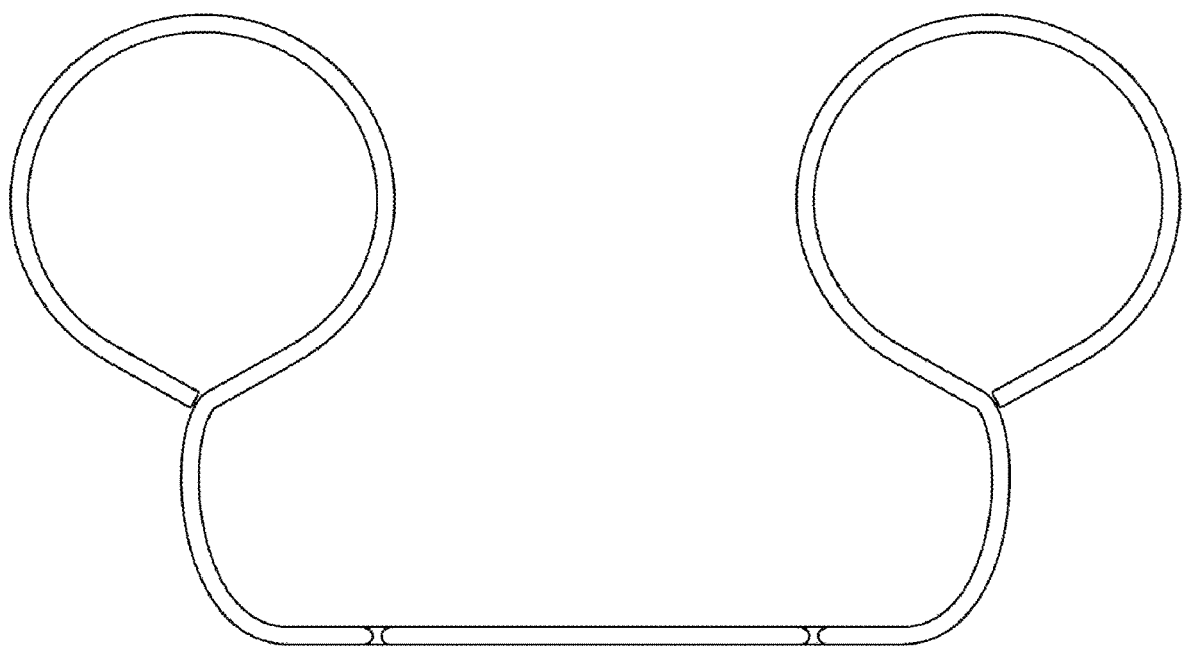
FIG. 9F shows a bottom view of the example mount shown in FIG. 9A, in accordance with one or more embodiments of the invention.

FIG. 9F shows a bottom view of the example mount shown in FIG. 9A, in accordance with one or more embodiments of the invention.

FIGS. 10A-F

Figure 10A:
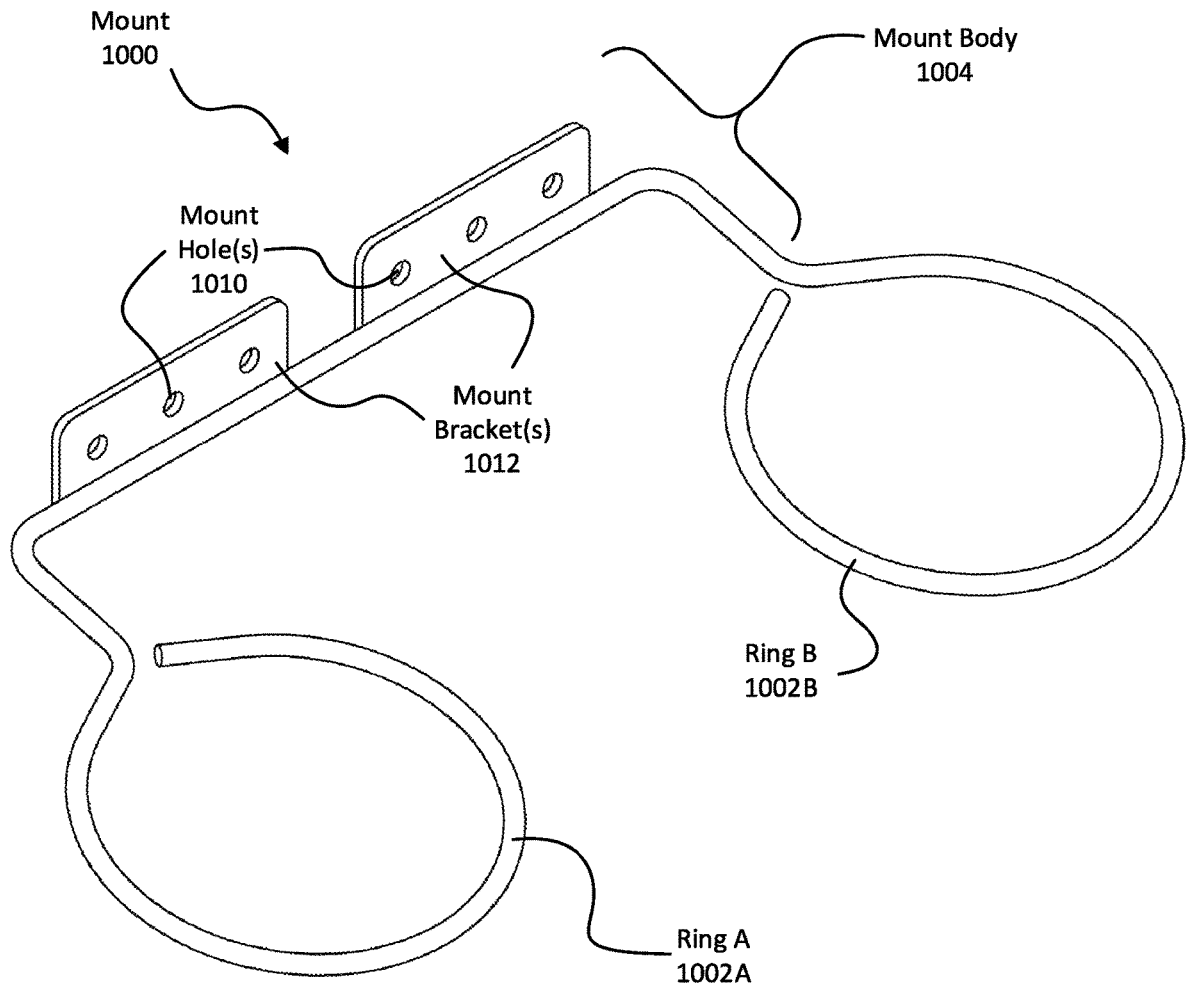
FIG. 10A shows an isometric view of an example of a mount, in accordance with one or more embodiments of the invention.

FIG. 10A shows an example of a mount, in accordance with one or more embodiments of the invention. Similarly named components, shown in this figure, have all of the same properties and functionalities as described in previous figures.

A mount (1000) may include a mount body (1004) and one or more ring(s) (ring A (1002A), ring B (1002B)). The mount body (1004) may include one or more mount bracket(s) (1012) and one or more mount hole(s) (1010).

While FIG. 10A shows a specific configuration of a mount, other configurations may be used without departing from the scope of the invention. Accordingly, embodiments disclosed herein should not be limited to the configuration of devices and/or components shown in FIG. 10A.

Figure 10B:
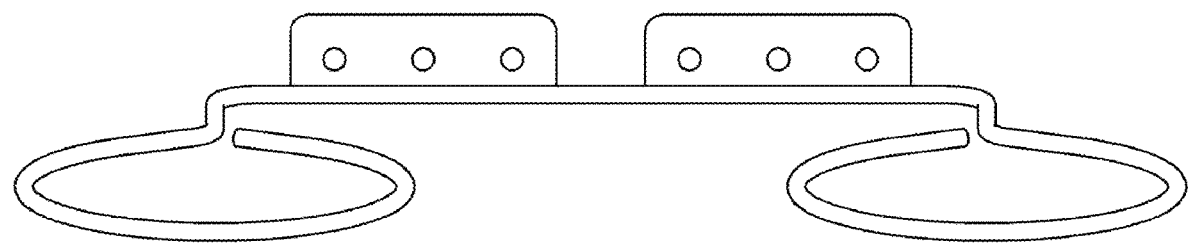
FIG. 10B shows a front view of the example mount shown in FIG. 10A, in accordance with one or more embodiments of the invention.

FIG. 10B shows a front view of the example mount shown in FIG. 10A, in accordance with one or more embodiments of the invention.

Figure 10C:
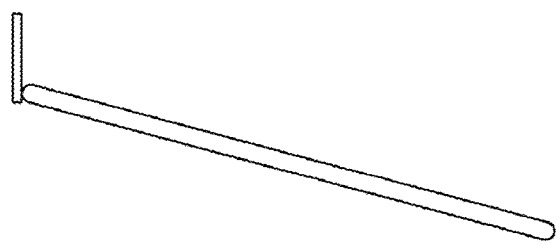
FIG. 10C shows a left view of the example mount shown in FIG. 10A, in accordance with one or more embodiments of the invention.

FIG. 10C shows a left view of the example mount shown in FIG. 10A, in accordance with one or more embodiments of the invention.

Figure 10D:
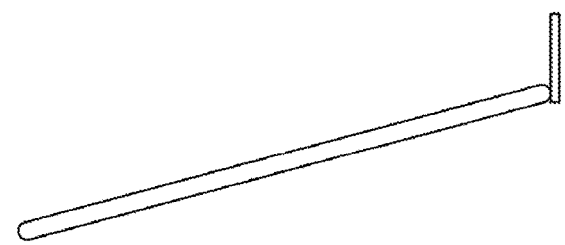
FIG. 10D shows a right view of the example mount shown in FIG. 10A, in accordance with one or more embodiments of the invention.

FIG. 10D shows a right view of the example mount shown in FIG. 10A, in accordance with one or more embodiments of the invention.

Figure 10E:
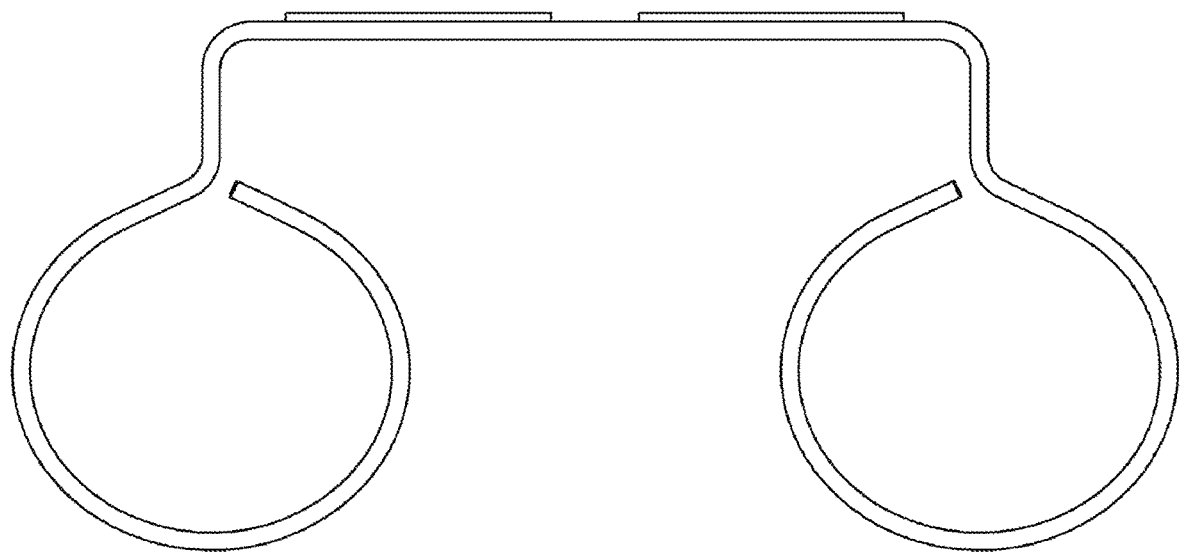
FIG. 10E shows a top view of the example mount shown in FIG. 10A, in accordance with one or more embodiments of the invention.

FIG. 10E shows a top view of the example mount shown in FIG. 10A, in accordance with one or more embodiments of the invention.

Figure 10F:
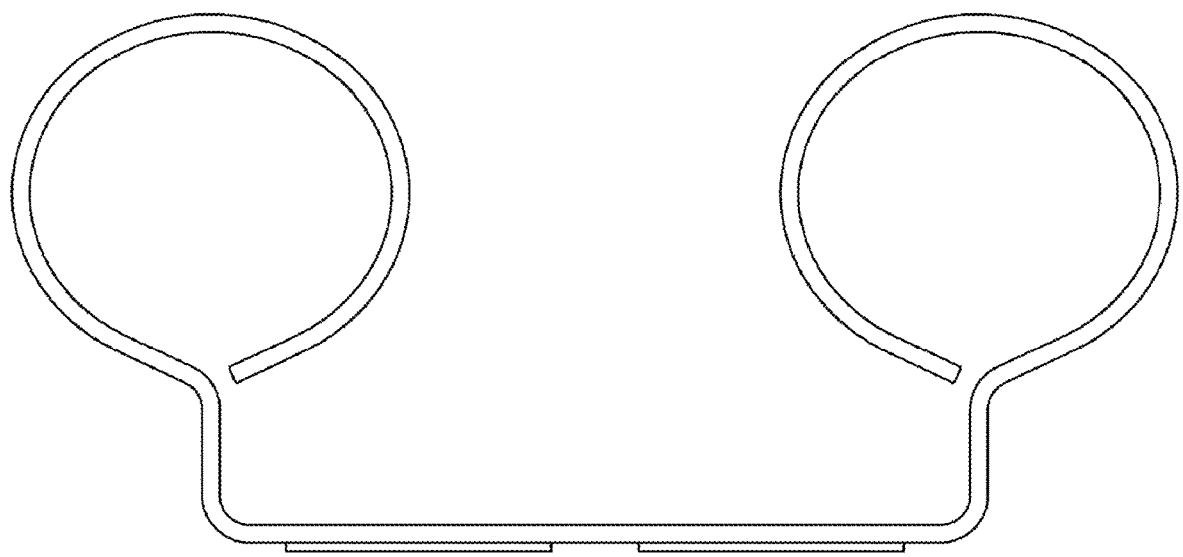
FIG. 10F shows a bottom view of the example mount shown in FIG. 10A, in accordance with one or more embodiments of the invention.

FIG. 10F shows a bottom view of the example mount shown in FIG. 10A, in accordance with one or more embodiments of the invention.

FIGS. 11A-F

Figure 11A:
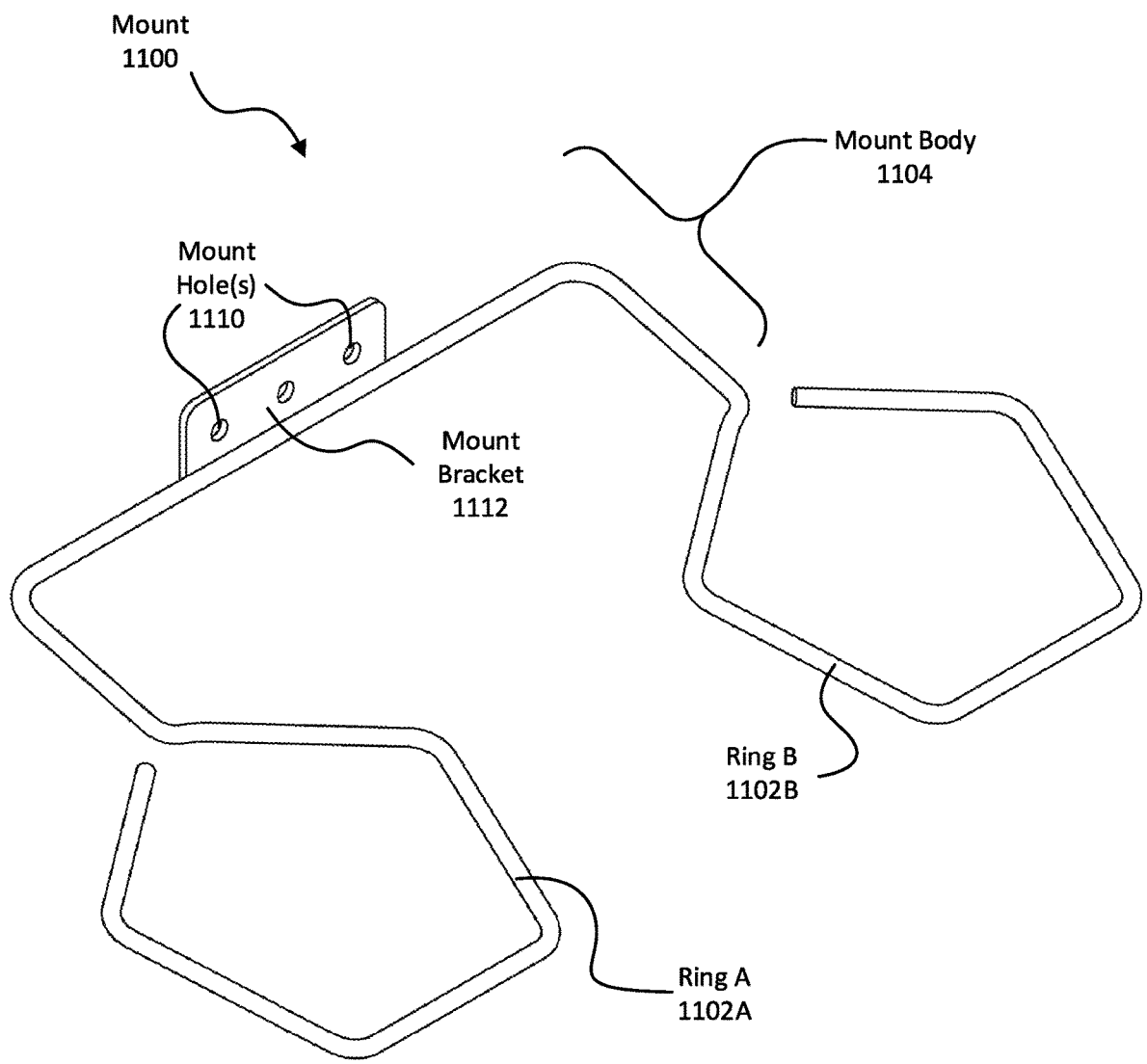
FIG. 11A shows an isometric view of an example of a mount, in accordance with one or more embodiments of the invention.
Figure 12A:
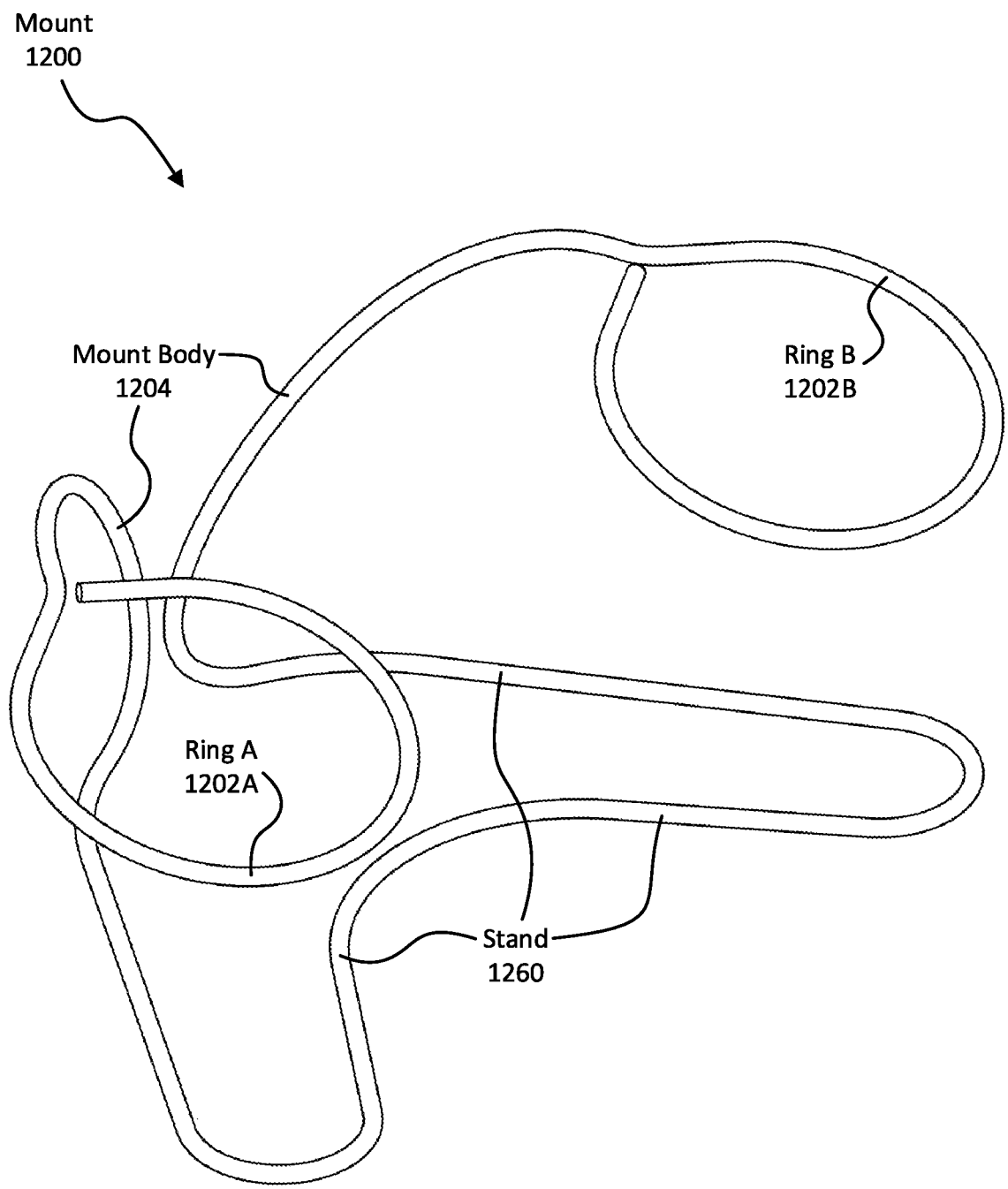
FIG. 12A shows an isometric view of an example of a mount, in accordance with one or more embodiments of the invention.

FIG. 11A shows an example of a mount, in accordance with one or more embodiments of the invention. Similarly named components, shown in this figure, have all of the same properties and functionalities as described in previous figures.

A mount (1100) may include a mount body (1104) and one or more ring(s) (ring A (1102A), ring B (1102B)). The mount body (1104) may include one or more mount bracket(s) (1112) and one or more mount hole(s) (1110).

While FIG. 11A shows a specific configuration of a mount, other configurations may be used without departing from the scope of the invention. Accordingly, embodiments disclosed herein should not be limited to the configuration of devices and/or components shown in FIG. 11A.

Figure 11B:
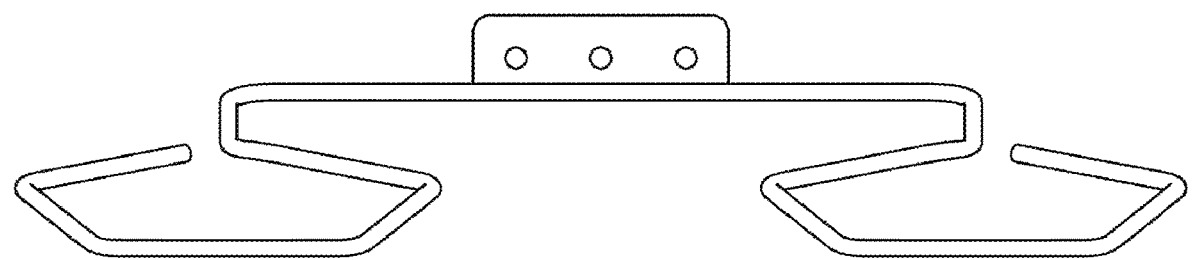
FIG. 11B shows a front view of the example mount shown in FIG. 11A, in accordance with one or more embodiments of the invention.

FIG. 11B shows a front view of the example mount shown in FIG. 11A, in accordance with one or more embodiments of the invention.

Figure 11C:
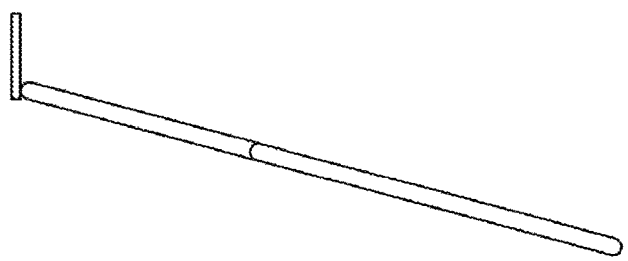
FIG. 11C shows a left view of the example mount shown in FIG. 11A, in accordance with one or more embodiments of the invention.

FIG. 11C shows a left view of the example mount shown in FIG. 11A, in accordance with one or more embodiments of the invention.

Figure 11D:
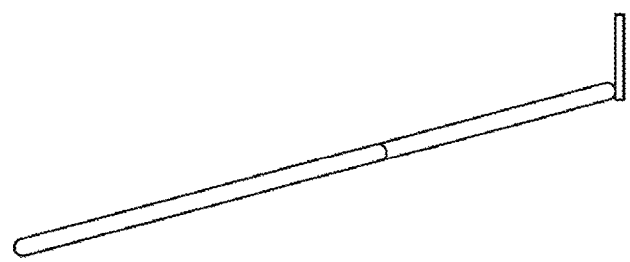
FIG. 11D shows a right view of the example mount shown in FIG. 11A, in accordance with one or more embodiments of the invention.

FIG. 11D shows a right view of the example mount shown in FIG. 11A, in accordance with one or more embodiments of the invention.

Figure 11E:
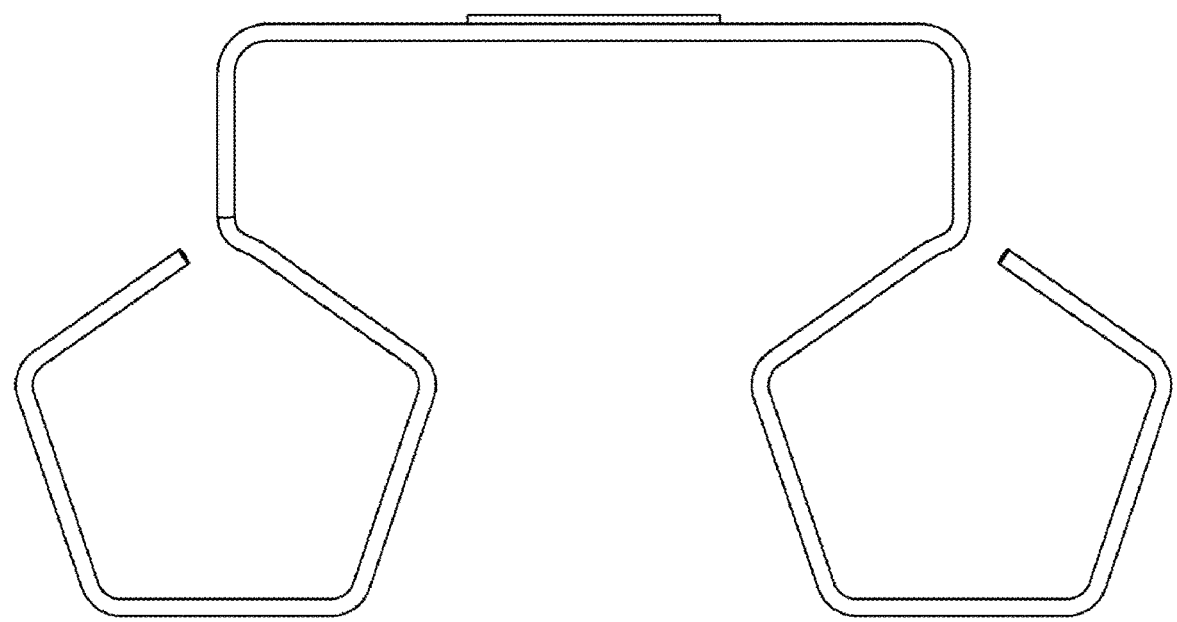
FIG. 11E shows a top view of the example mount shown in FIG. 11A, in accordance with one or more embodiments of the invention.

FIG. 11E shows a top view of the example mount shown in FIG. 11A, in accordance with one or more embodiments of the invention.

Figure 11F:
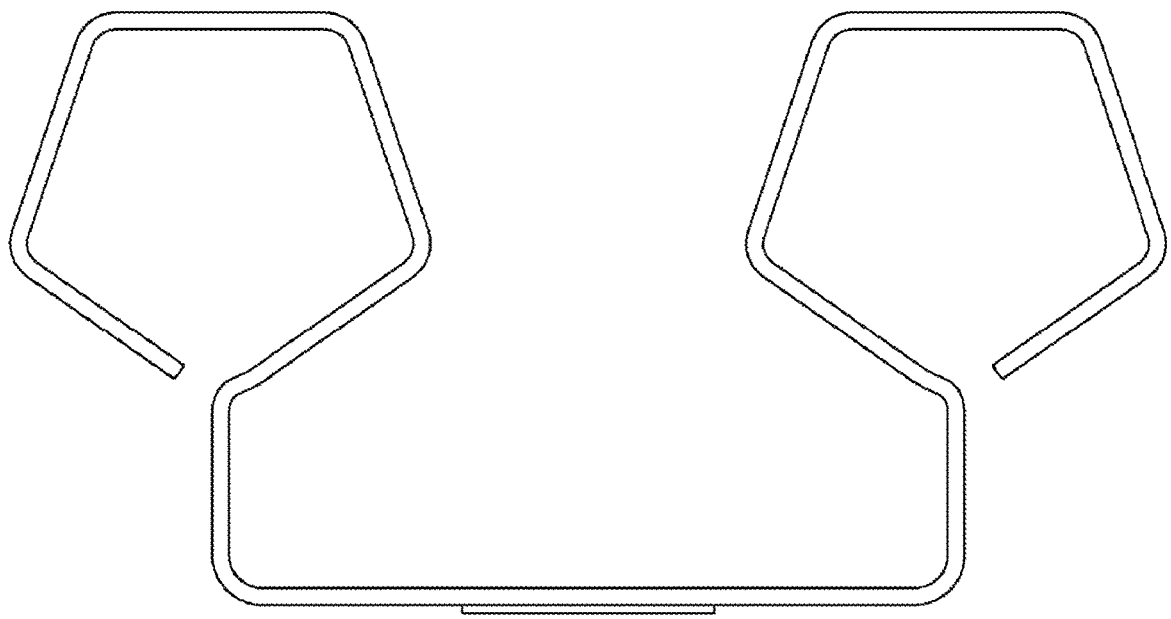
FIG. 11F shows a bottom view of the example mount shown in FIG. 11A, in accordance with one or more embodiments of the invention.

FIG. 11F shows a bottom view of the example mount shown in FIG. 11A, in accordance with one or more embodiments of the invention.

FIGS. 12A-F

FIG. 12A shows an example of a mount, in accordance with one or more embodiments of the invention. Similarly named components, shown in this figure, have all of the same properties and functionalities as described in previous figures.

A mount (1200) may include a mount body (1204) and one or more ring(s) (ring A (1202A), ring B (1202B)). The mount body (1204) may include and/or be connected to a stand (1260).

While FIG. 12A shows a specific configuration of a mount, other configurations may be used without departing from the scope of the invention. Accordingly, embodiments disclosed herein should not be limited to the configuration of devices and/or components shown in FIG. 12A.

Figure 12B:
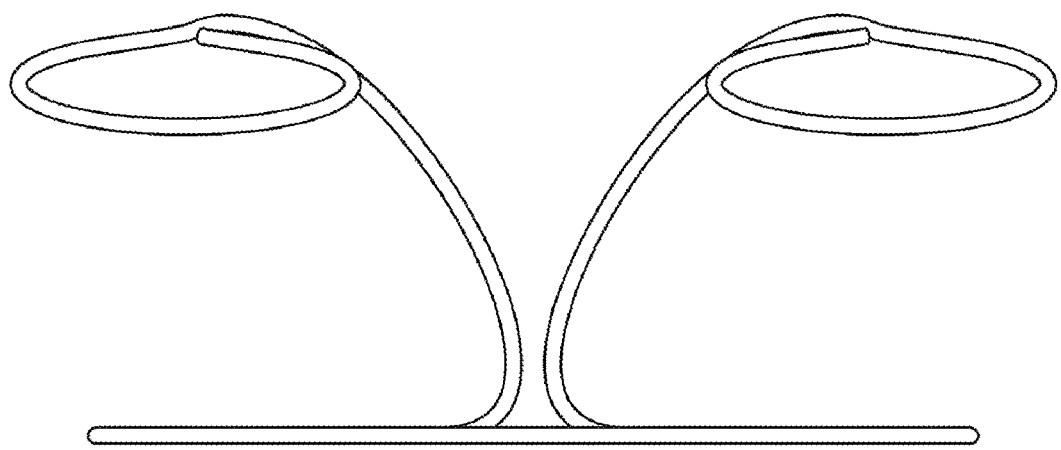
FIG. 12B shows a front view of the example mount shown in FIG. 12A, in accordance with one or more embodiments of the invention.

FIG. 12B shows a front view of the example mount shown in FIG. 12A, in accordance with one or more embodiments of the invention.

Figure 12C:
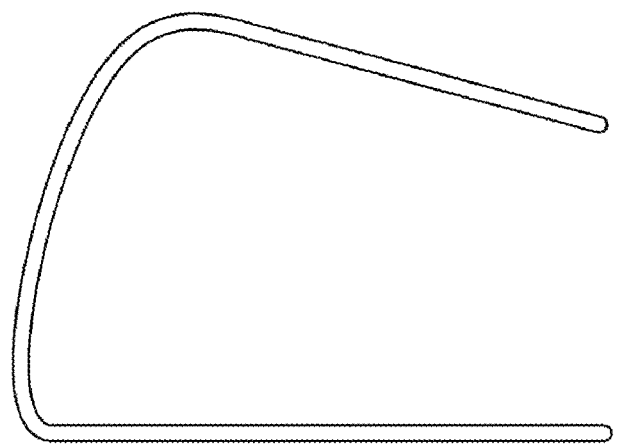
FIG. 12C shows a left view of the example mount shown in FIG. 12A, in accordance with one or more embodiments of the invention.

FIG. 12C shows a left view of the example mount shown in FIG. 12A, in accordance with one or more embodiments of the invention.

Figure 12D:
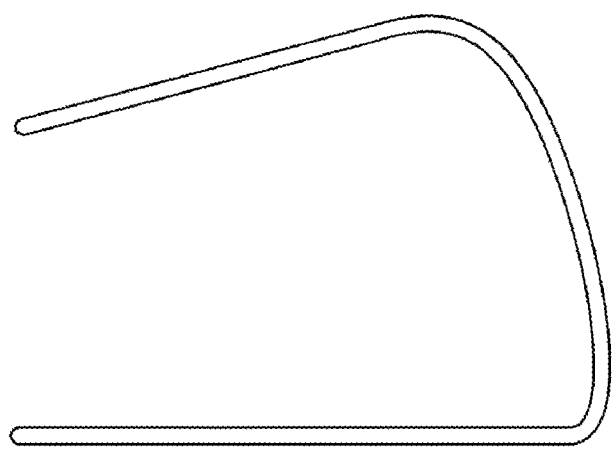
FIG. 12D shows a right view of the example mount shown in FIG. 12A, in accordance with one or more embodiments of the invention.

FIG. 12D shows a right view of the example mount shown in FIG. 12A, in accordance with one or more embodiments of the invention.

Figure 12E:
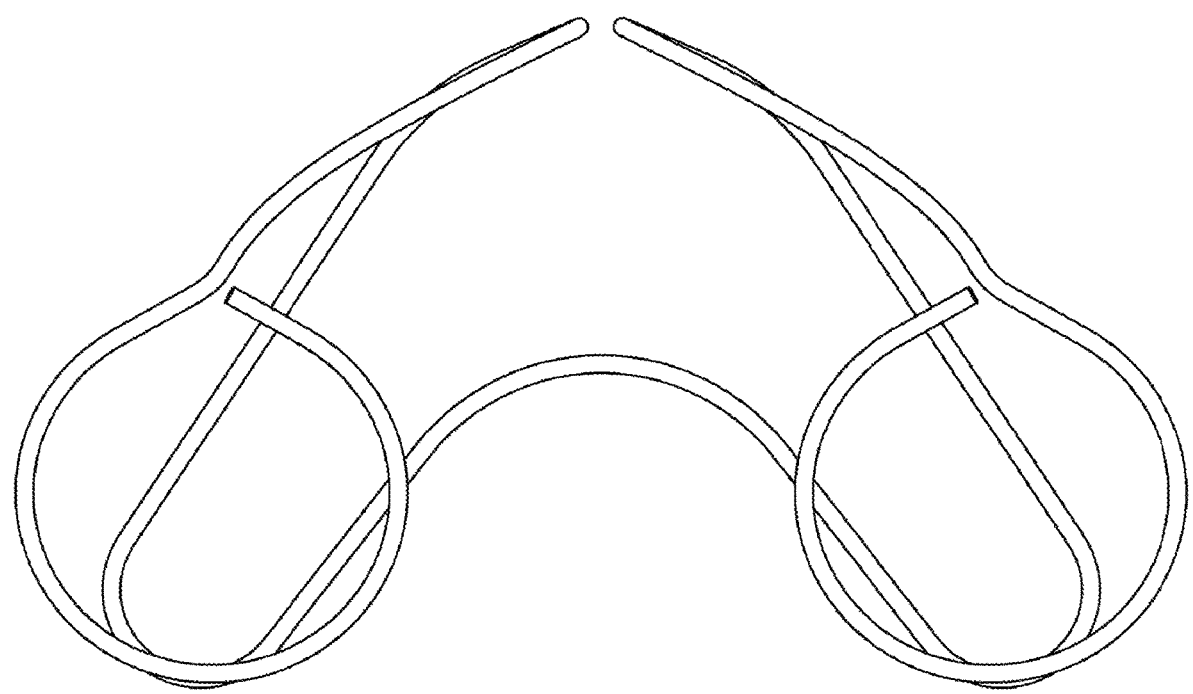
FIG. 12E shows a top view of the example mount shown in FIG. 12A, in accordance with one or more embodiments of the invention.

FIG. 12E shows a top view of the example mount shown in FIG. 12A, in accordance with one or more embodiments of the invention.

Figure 12F:
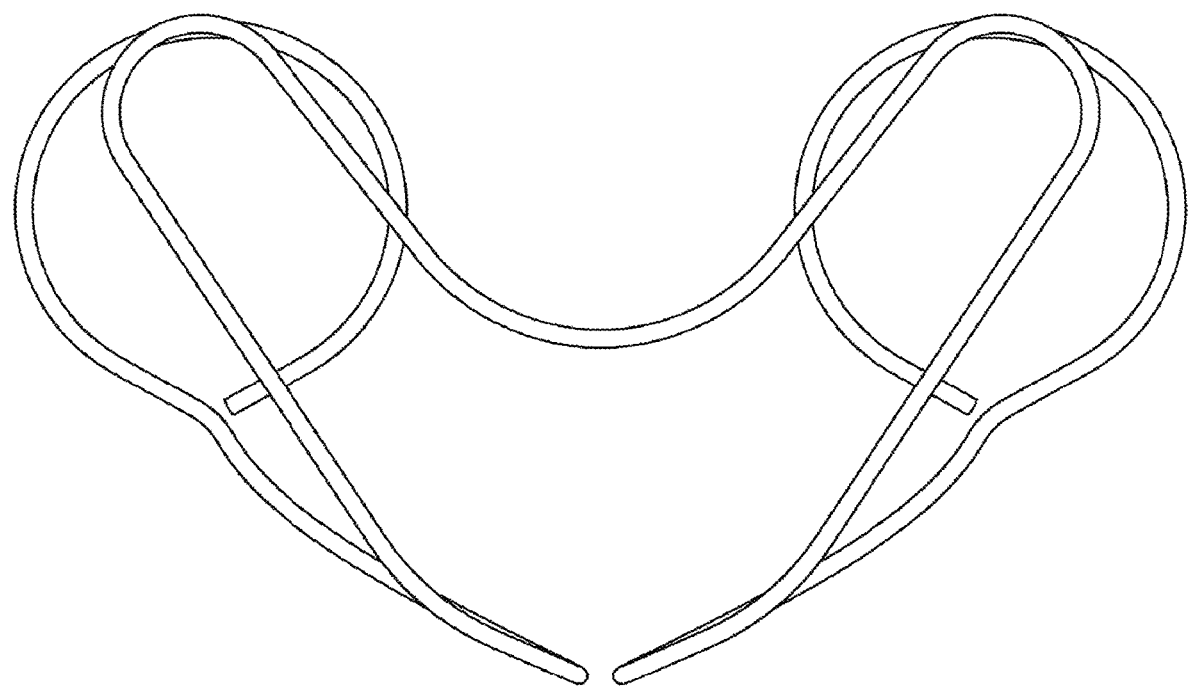
FIG. 12F shows a bottom view of the example mount shown in FIG. 12A, in accordance with one or more embodiments of the invention.

FIG. 12F shows a bottom view of the example mount shown in FIG. 12A, in accordance with one or more embodiments of the invention.

FIGS. 13A-F

Figure 13A:
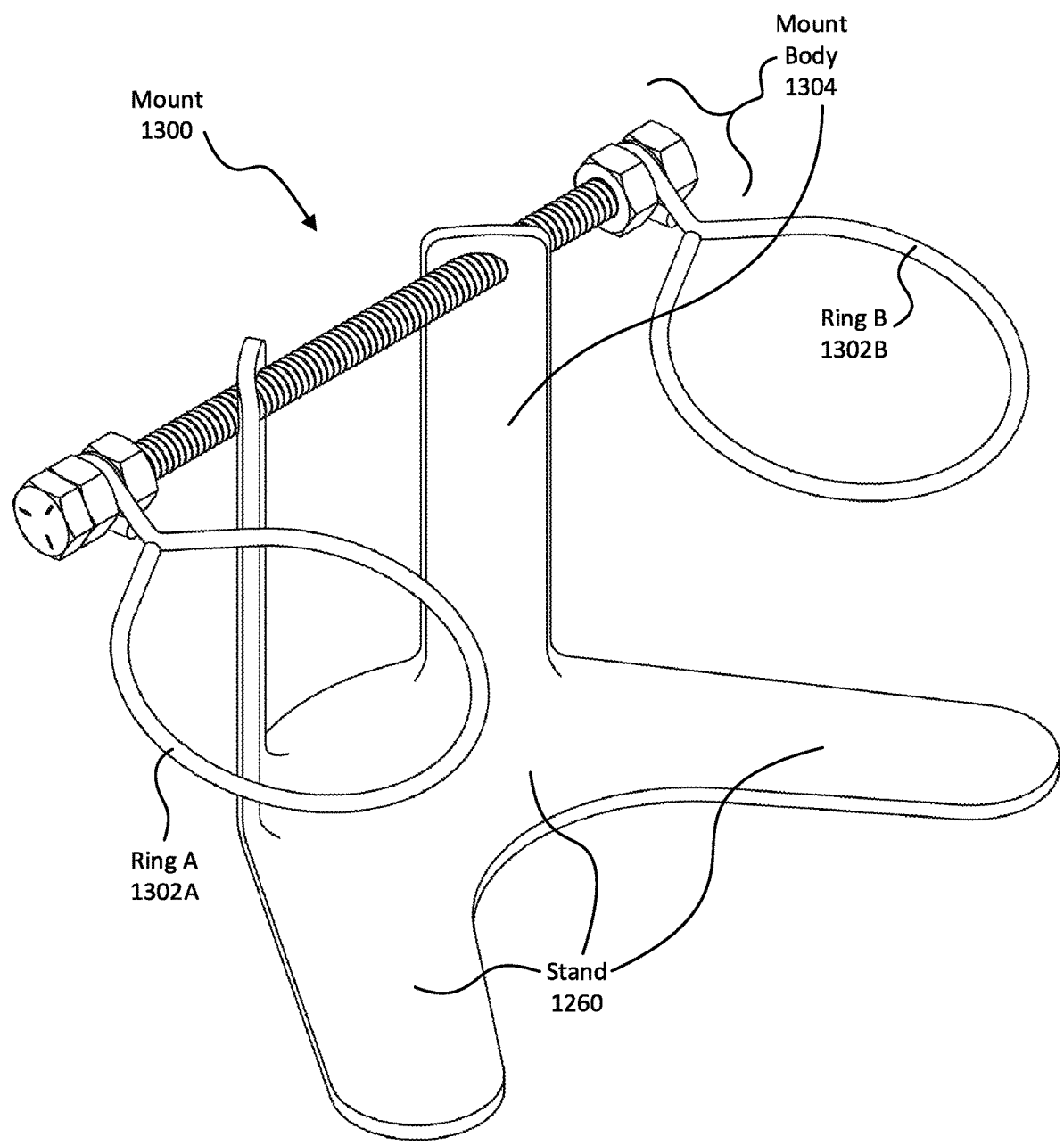
FIG. 13A shows an isometric view of an example of a mount, in accordance with one or more embodiments of the invention.

FIG. 13A shows an example of a mount, in accordance with one or more embodiments of the invention. Similarly named components, shown in this figure, have all of the same properties and functionalities as described in previous figures.

A mount (1300) may include a mount body (1304) and one or more ring(s) (ring A (1302A), ring B (1302B)). The mount body (1304) may include and/or be connected to a stand (1360).

While FIG. 13A shows a specific configuration of a mount, other configurations may be used without departing from the scope of the invention. Accordingly, embodiments disclosed herein should not be limited to the configuration of devices and/or components shown in FIG. 13A.

Figure 13B:
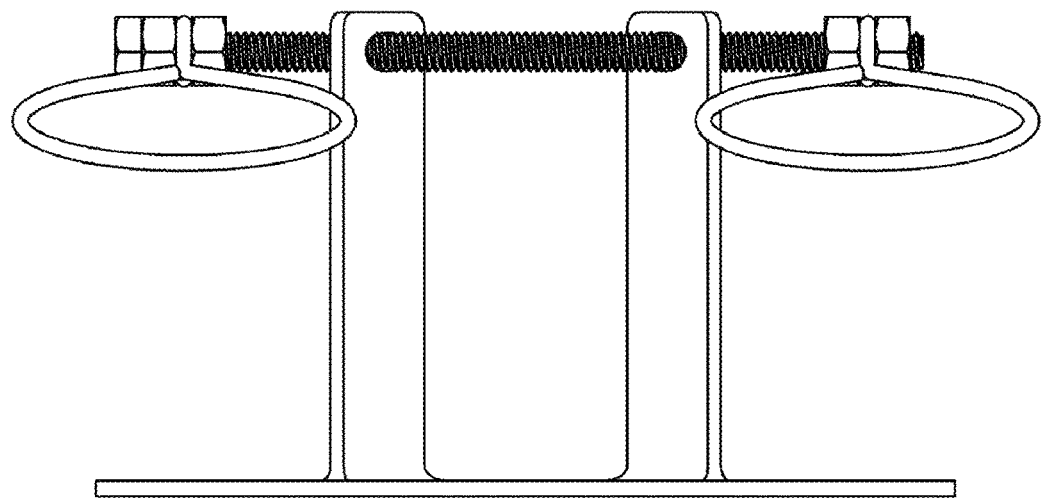
FIG. 13B shows a front view of the example mount shown in FIG. 13A, in accordance with one or more embodiments of the invention.

FIG. 13B shows a front view of the example mount shown in FIG. 13A, in accordance with one or more embodiments of the invention.

Figure 13C:
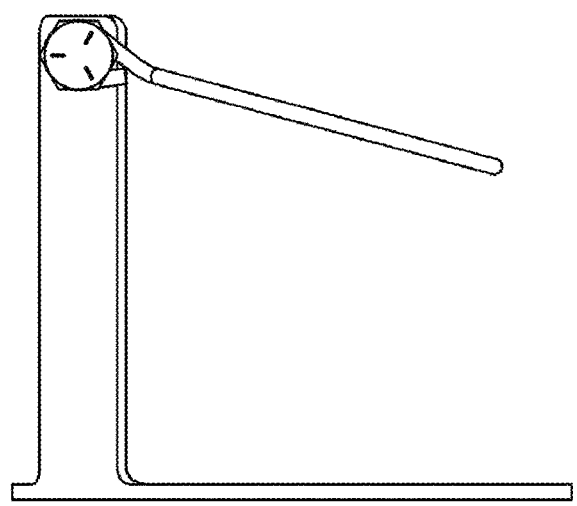
FIG. 13C shows a left view of the example mount shown in FIG. 13A, in accordance with one or more embodiments of the invention.

FIG. 13C shows a left view of the example mount shown in FIG. 13A, in accordance with one or more embodiments of the invention.

Figure 13D:
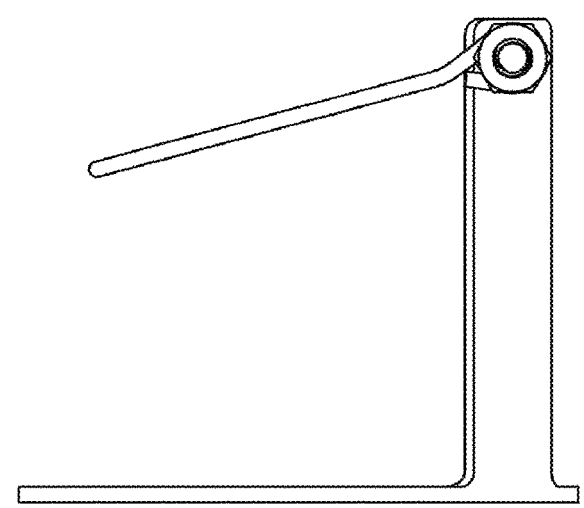
FIG. 13D shows a right view of the example mount shown in FIG. 13A, in accordance with one or more embodiments of the invention.

FIG. 13D shows a right view of the example mount shown in FIG. 13A, in accordance with one or more embodiments of the invention.

Figure 13E:
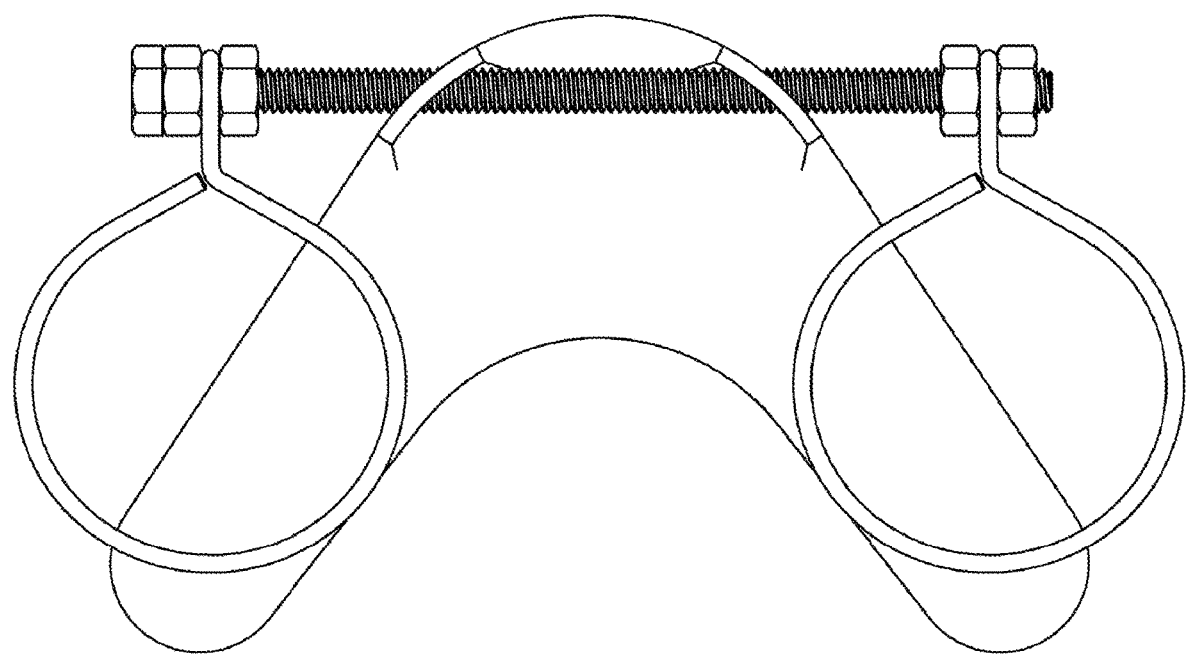
FIG. 13E shows a top view of the example mount shown in FIG. 13A, in accordance with one or more embodiments of the invention.

FIG. 13E shows a top view of the example mount shown in FIG. 13A, in accordance with one or more embodiments of the invention.

Figure 13F:
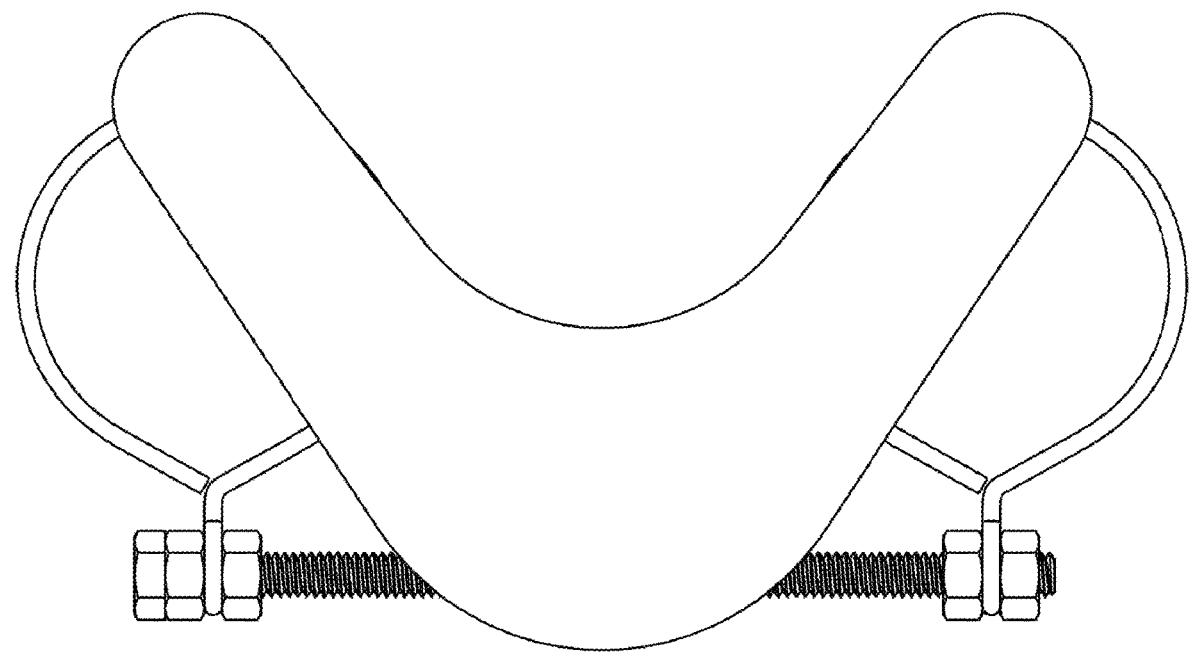
FIG. 13F shows a bottom view of the example mount shown in FIG. 13A, in accordance with one or more embodiments of the invention.

FIG. 13F shows a bottom view of the example mount shown in FIG. 13A, in accordance with one or more embodiments of the invention.

FIGS. 14A-F

FIG. 14A shows an example of a mount, in accordance with one or more embodiments of the invention. Similarly named components, shown in this figure, have all of the same properties and functionalities as described in previous figures.

A mount (1400) may include a mount body (1404) and one or more ring(s) (ring A (1402A), ring B (1402B)). The mount body (1404) may include and/or be connected to a stand (1460).

While FIG. 14A shows a specific configuration of a mount, other configurations may be used without departing from the scope of the invention. Accordingly, embodiments disclosed herein should not be limited to the configuration of devices and/or components shown in FIG. 14A.

Figure 14B:
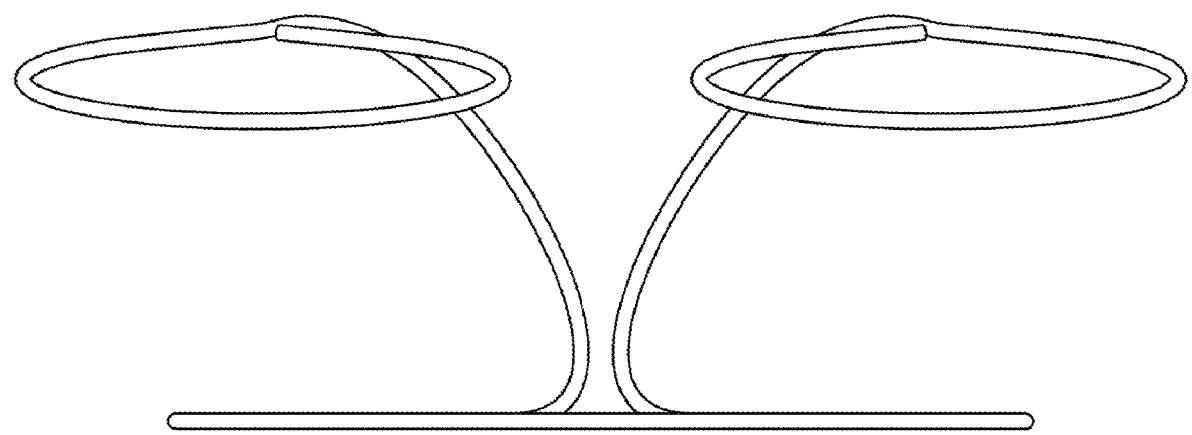
FIG. 14B shows a front view of the example mount shown in FIG. 14A, in accordance with one or more embodiments of the invention.

FIG. 14B shows a front view of the example mount shown in FIG. 14A, in accordance with one or more embodiments of the invention.

Figure 14C:
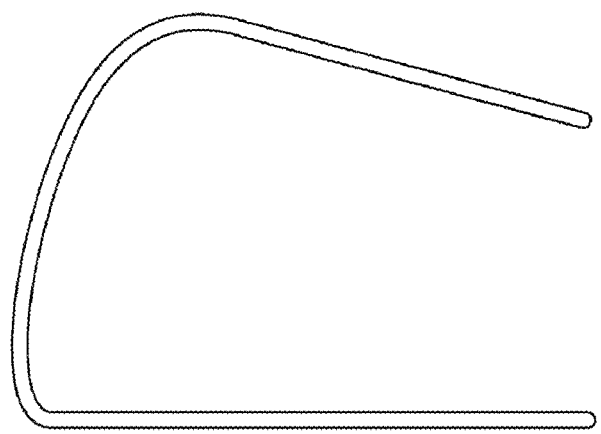
FIG. 14C shows a left view of the example mount shown in FIG. 14A, in accordance with one or more embodiments of the invention.

FIG. 14C shows a left view of the example mount shown in FIG. 14A, in accordance with one or more embodiments of the invention.

Figure 14D:
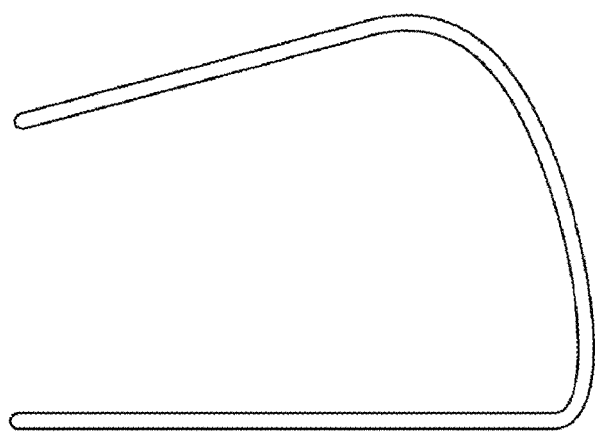
FIG. 14D shows a right view of the example mount shown in FIG. 14A, in accordance with one or more embodiments of the invention.

FIG. 14D shows a right view of the example mount shown in FIG. 14A, in accordance with one or more embodiments of the invention.

Figure 14E:
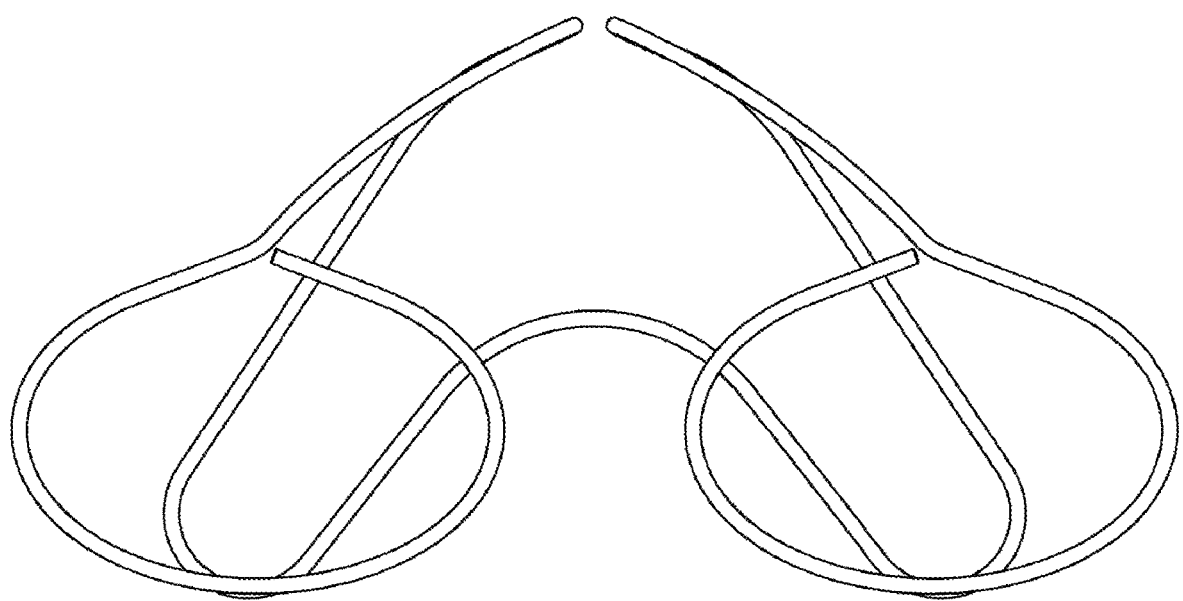
FIG. 14E shows a top view of the example mount shown in FIG. 14A, in accordance with one or more embodiments of the invention.

FIG. 14E shows a top view of the example mount shown in FIG. 14A, in accordance with one or more embodiments of the invention.

Figure 14F:
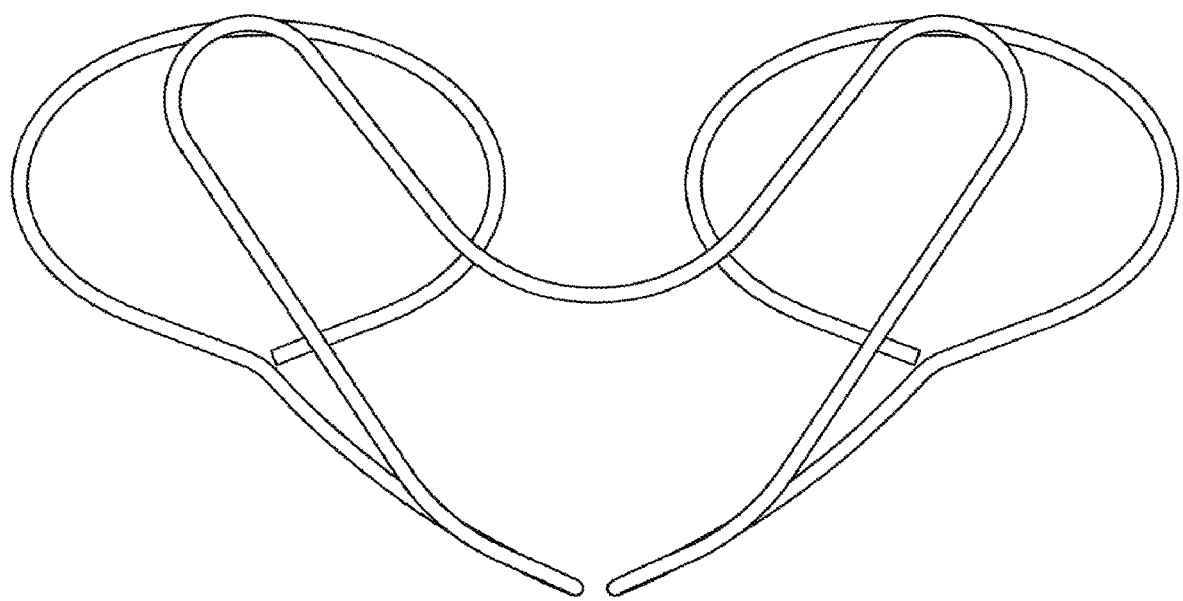
FIG. 14F shows a bottom view of the example mount shown in FIG. 14A, in accordance with one or more embodiments of the invention.

FIG. 14F shows a bottom view of the example mount shown in FIG. 14A, in accordance with one or more embodiments of the invention.

FIGS. 15A-F

Figure 15A:
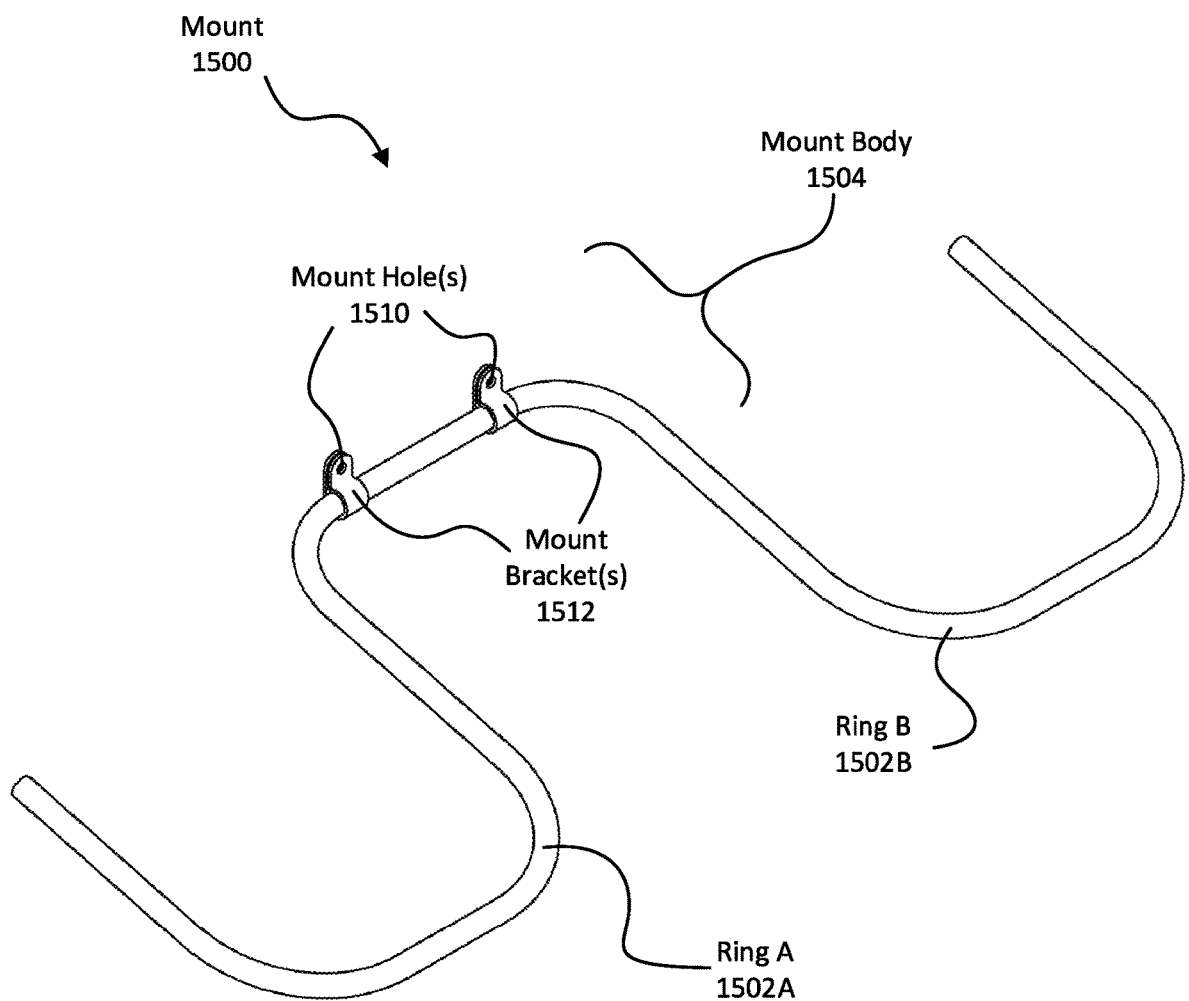
FIG. 15A shows an isometric view of an example of a mount, in accordance with one or more embodiments of the invention.

FIG. 15A shows an example of a mount, in accordance with one or more embodiments of the invention. Similarly named components, shown in this figure, have all of the same properties and functionalities as described in previous figures.

A mount (1500) may include a mount body (1504) and one or more ring(s) (ring A (1502A), ring B (1502B)). The mount body (1504) may include one or more mount bracket(s) (1512) and one or more mount hole(s) (1510).

While FIG. 15A shows a specific configuration of a mount, other configurations may be used without departing from the scope of the invention. Accordingly, embodiments disclosed herein should not be limited to the configuration of devices and/or components shown in FIG. 15A.

Figure 15B:
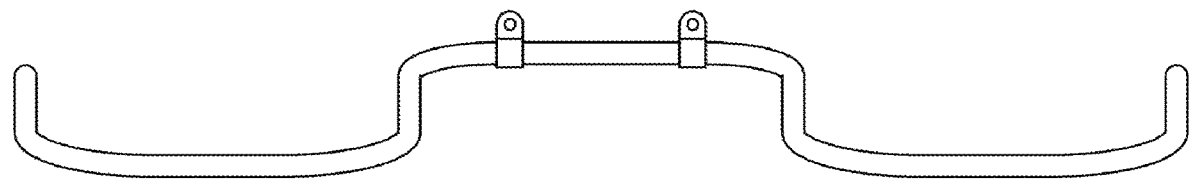
FIG. 15B shows a front view of the example mount shown in FIG. 15A, in accordance with one or more embodiments of the invention.

FIG. 15B shows a front view of the example mount shown in FIG. 15A, in accordance with one or more embodiments of the invention.

Figure 15C:
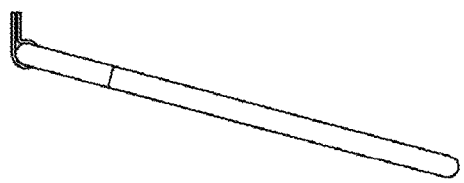
FIG. 15C shows a left view of the example mount shown in FIG. 15A, in accordance with one or more embodiments of the invention.

FIG. 15C shows a left view of the example mount shown in FIG. 15A, in accordance with one or more embodiments of the invention.

Figure 15D:
FIG. 15D shows a right view of the example mount shown in FIG. 15A, in accordance with one or more embodiments of the invention.

FIG. 15D shows a right view of the example mount shown in FIG. 15A, in accordance with one or more embodiments of the invention.

Figure 15E:
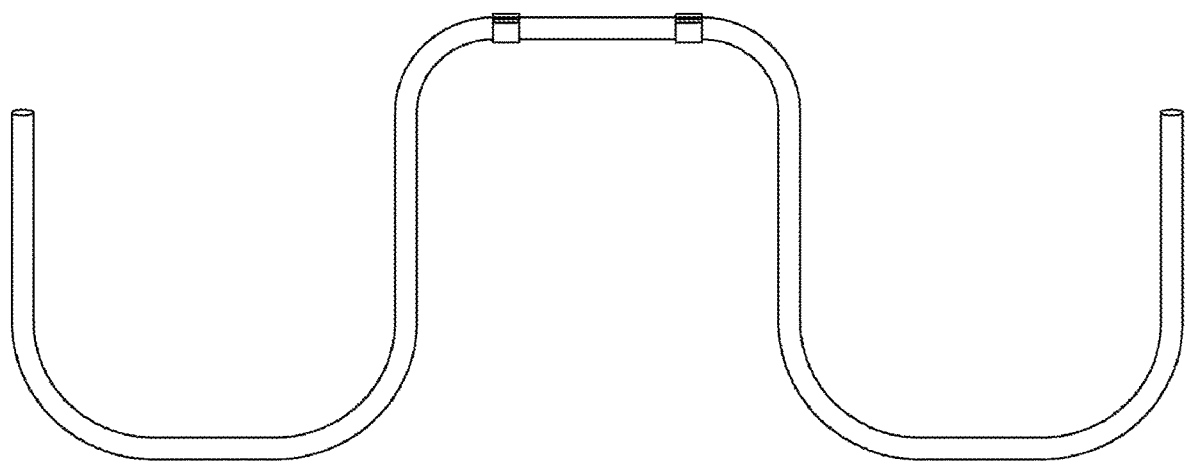
FIG. 15E shows a top view of the example mount shown in FIG. 15A, in accordance with one or more embodiments of the invention.

FIG. 15E shows a top view of the example mount shown in FIG. 15A, in accordance with one or more embodiments of the invention.

Figure 15F:
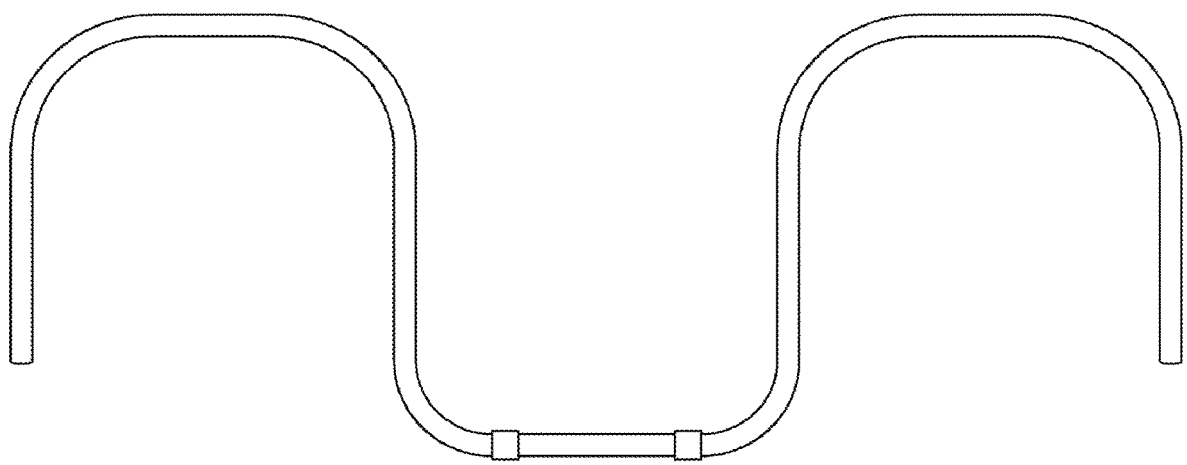
FIG. 15F shows a bottom view of the example mount shown in FIG. 15A, in accordance with one or more embodiments of the invention.

FIG. 15F shows a bottom view of the example mount shown in FIG. 15A, in accordance with one or more embodiments of the invention.

FIGS. 16A-F

Figure 16A:
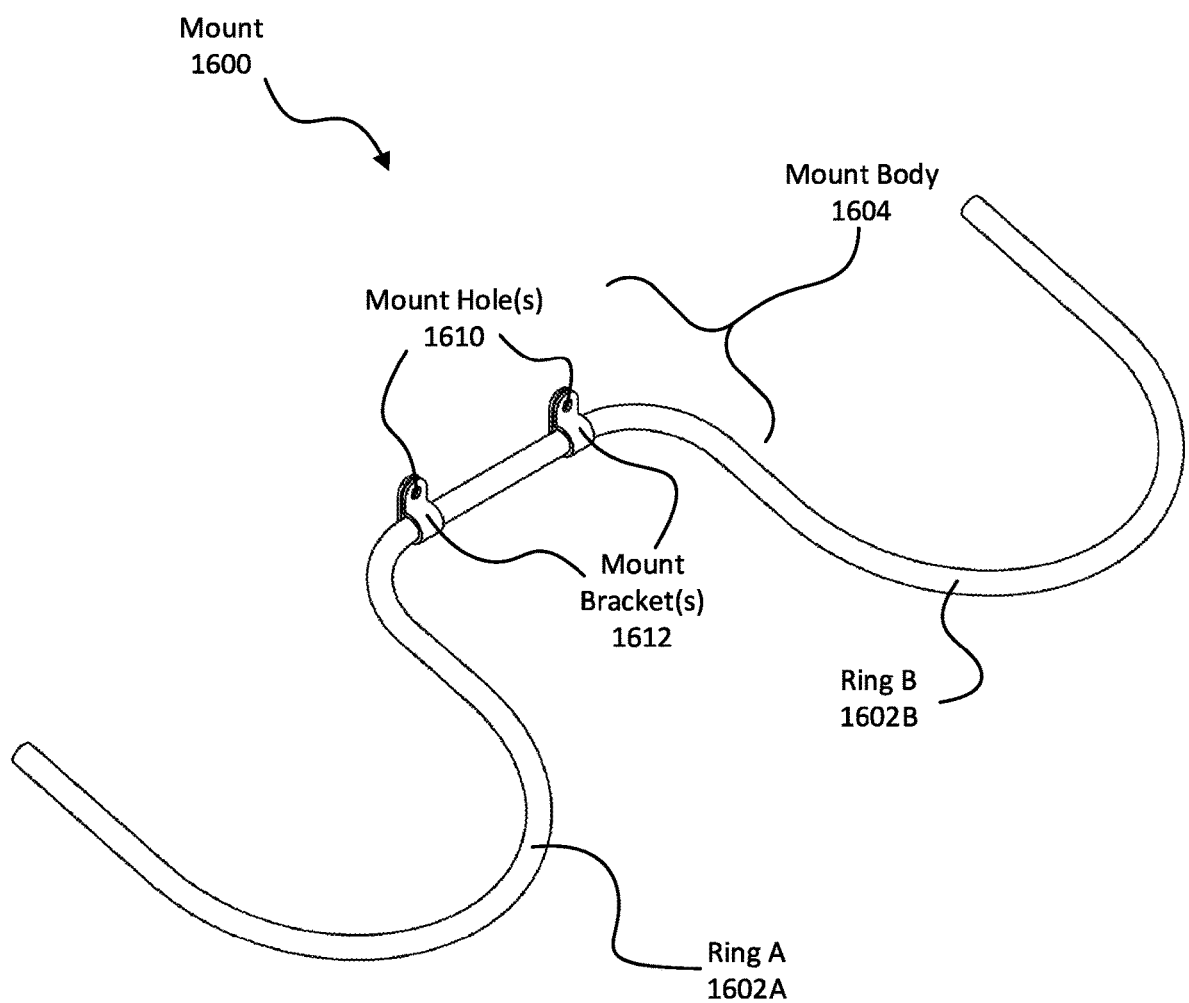
FIG. 16A shows an isometric view of an example of a mount, in accordance with one or more embodiments of the invention.

FIG. 16A shows an example of a mount, in accordance with one or more embodiments of the invention. Similarly named components, shown in this figure, have all of the same properties and functionalities as described in previous figures.

A mount (1600) may include a mount body (1604) and one or more ring(s) (ring A (1602A), ring B (1602B)). The mount body (1604) may include one or more mount bracket(s) (1612) and one or more mount hole(s) (1610).

While FIG. 16A shows a specific configuration of a mount, other configurations may be used without departing from the scope of the invention. Accordingly, embodiments disclosed herein should not be limited to the configuration of devices and/or components shown in FIG. 16A.

Figure 16B:
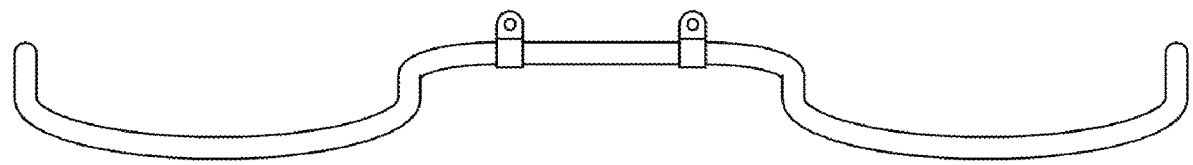
FIG. 16B shows a front view of the example mount shown in FIG. 16A, in accordance with one or more embodiments of the invention.

FIG. 16B shows a front view of the example mount shown in FIG. 16A, in accordance with one or more embodiments of the invention.

Figure 16C:
FIG. 16C shows a left view of the example mount shown in FIG. 16A, in accordance with one or more embodiments of the invention.

FIG. 16C shows a left view of the example mount shown in FIG. 16A, in accordance with one or more embodiments of the invention.

Figure 16D:
FIG. 16D shows a right view of the example mount shown in FIG. 16A, in accordance with one or more embodiments of the invention.

FIG. 16D shows a right view of the example mount shown in FIG. 16A, in accordance with one or more embodiments of the invention.

Figure 16E:
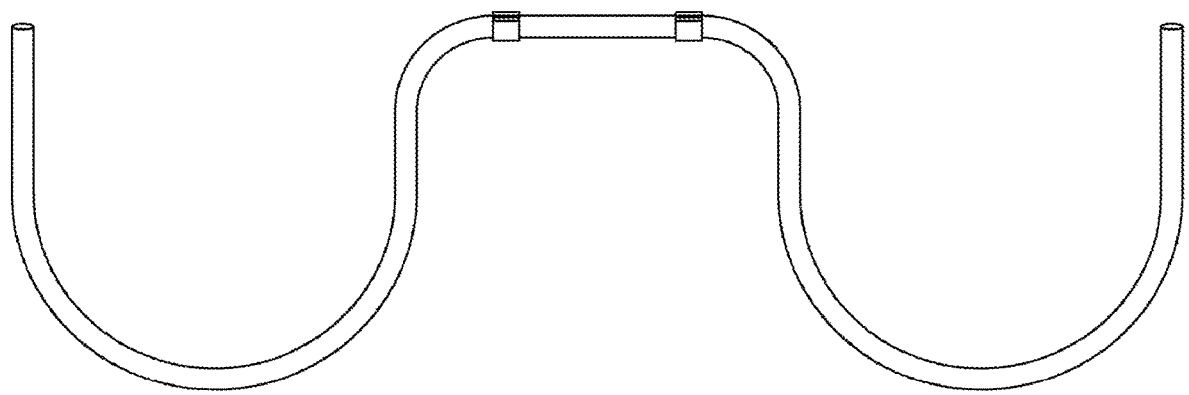
FIG. 16E shows a top view of the example mount shown in FIG. 16A, in accordance with one or more embodiments of the invention.

FIG. 16E shows a top view of the example mount shown in FIG. 16A, in accordance with one or more embodiments of the invention.

Figure 16F:
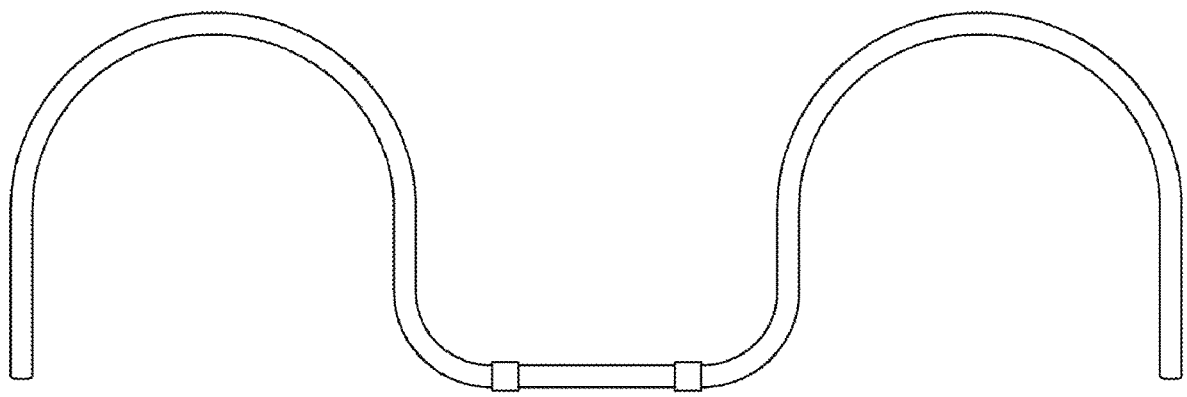
FIG. 16F shows a bottom view of the example mount shown in FIG. 16A, in accordance with one or more embodiments of the invention.

FIG. 16F shows a bottom view of the example mount shown in FIG. 16A, in accordance with one or more embodiments of the invention.

What is claimed is:

1. A mount, comprising:
  a first ring, comprising:
    a first ring opening coincident to a ring plane and adapted to allow a first grip of a handheld device to pass partially through the ring plane; and
    a first ring outer portion adapted to prevent a first lateral movement of the first grip; and
  a second ring, comprising:
    a second ring opening coincident to the ring plane and adapted to allow a second grip of the handheld device to pass partially through the ring plane,
  wherein the ring plane is disposed at a ring angle below a horizontal plane.

2. The mount of claim 1, wherein the mount is adapted to allow a third grip of the handheld device to pass partially between the first ring and the second ring.

3. The mount of claim 1, wherein the mount further comprises a mount bracket.

4. The mount of claim 3, wherein the mount bracket comprises a mount hole.

5. The mount of claim 4, wherein the mount hole is adapted to allow a fastener to pass partially therethrough.

6. The mount of claim 5, wherein the mount bracket is adapted to connect to a vertical surface, wherein the mount bracket and the vertical surface maintain contact due to the fastener.

7. The mount of claim 1, wherein the first ring and the second ring are constructed from a single wire.

8. The mount of claim 1, wherein the second ring further comprises:
  a second ring outer portion adapted to prevent a second lateral movement of the second grip.

9. A mount, comprising:
  a first ring, comprising:
    a first ring opening coincident to a ring plane and adapted to allow a first grip of a handheld device to pass partially through the ring plane; and
    a first ring outer portion adapted to prevent a first lateral movement of the first grip; and
  a second ring, comprising:
    a second ring opening coincident to the ring plane and adapted to allow a second grip of the handheld device to pass partially through the ring plane,
  wherein the handheld device is a gaming controller.

10. The mount of claim 9, wherein:
  the first grip substantially extends from a main body of the gaming controller, and
  the second grip substantially extends from the main body of the gaming controller.

11. A mount, comprising:
  a first ring adapted to allow a first grip of a handheld device to pass partially therethrough, comprising:
    a first ring outer portion adapted to prevent a first lateral movement of the first grip; and
  a second ring adapted to allow a second grip of the handheld device to pass partially therethrough,
  wherein the handheld device is a gaming controller,
  wherein the first grip substantially extends from a main body of the gaming controller, and
  wherein the second grip substantially extends from the main body of the gaming controller.

12. A mount, comprising:
  a first ring, comprising:
    a first ring opening disposed in a ring plane; and
    a first ring outer portion adapted to prevent a first lateral movement of a handheld device;
  a second ring, comprising:
    a second ring opening disposed in the ring plane; and
    a second ring outer portion adapted to prevent a second lateral movement of the handheld device; and
  a seat adapted to:
    support an underside of a main body of the handheld device; and
    contact the handheld device at two locations,
  wherein the ring plane is disposed at a ring angle below a horizontal plane.

13. The mount of claim 12, wherein the seat protrudes below the ring plane.

14. The mount of claim 13, wherein the underside of the main body of the handheld device is disposed below the ring plane when the handheld device is installed in the mount.

15. The mount of claim 14, wherein the handheld device does not comprise a grip that substantially extends from the main body the handheld device.

16. The mount of claim 9, wherein the mount is adapted to allow a third grip of the handheld device to pass partially between the first ring and the second ring.

17. The mount of claim 9, wherein the mount further comprises a mount bracket.

18. The mount of claim 17, wherein the mount bracket comprises a mount hole.

19. The mount of claim 9, wherein the first ring and the second ring are constructed from a single wire.

20. The mount of claim 11, wherein the mount is adapted to allow a third grip of the handheld device to pass partially between the first ring and the second ring.

21. The mount of claim 11, wherein the mount further comprises a mount bracket.

22. The mount of claim 21, wherein the mount bracket comprises a mount hole.

23. The mount of claim 11, wherein the first ring and the second ring are constructed from a single wire.

24. The mount of claim 12, wherein the mount is adapted to allow a third grip of the handheld device to pass partially between the first ring and the second ring.

25. The mount of claim 12, wherein the mount further comprises a mount bracket.

26. The mount of claim 25, wherein the mount bracket comprises a mount hole.

27. The mount of claim 12, wherein the first ring and the second ring are constructed from a single wire.

\* \* \* \* \*